(12) United States Patent
Ozeki et al.

(10) Patent No.: US 12,090,951 B2
(45) Date of Patent: Sep. 17, 2024

(54) PEDESTRIAN AIRBAG DEVICE

(71) Applicant: TOYODA GOSEI CO., LTD., Kiyosu (JP)

(72) Inventors: Makoto Ozeki, Kiyosu (JP); Akira Yasuda, Kiyosu (JP); Taizo Suemitsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 367 days.

(21) Appl. No.: 17/576,500

(22) Filed: Jan. 14, 2022

(65) Prior Publication Data
US 2022/0250579 A1 Aug. 11, 2022

(30) Foreign Application Priority Data
Feb. 8, 2021 (JP) .................................. 2021-18590

(51) Int. Cl.
*B60R 21/36* (2011.01)
*B60R 21/00* (2006.01)
(Continued)

(52) U.S. Cl.
CPC ........ *B60R 21/36* (2013.01); *B60R 21/23138* (2013.01); *B60R 21/2338* (2013.01);
(Continued)

(58) Field of Classification Search
CPC .............. B60R 21/36; B60R 21/23138; B60R 21/2338; B60R 2021/0006;
(Continued)

(56) References Cited

U.S. PATENT DOCUMENTS

| 2002/0038949 | A1 | 4/2002 | Okada et al. |
| 2014/0291055 | A1* | 10/2014 | Tanaka ................ B60R 21/36 |
| | | | 180/274 |

(Continued)

FOREIGN PATENT DOCUMENTS

| EP | 2586665 | A1 * | 5/2013 | ............. B60R 21/36 |
| EP | 3012161 | A1 * | 4/2016 | ............. B60R 21/20 |

(Continued)

OTHER PUBLICATIONS

Office Action dated Jul. 14, 2023 issued in corresponding JP Patent Application No. 2021-18590 (and English Translation).

*Primary Examiner* — Lori Lyjak
(74) *Attorney, Agent, or Firm* — Posz Law Group, PLC

(57) ABSTRACT

A pedestrian airbag device includes an airbag and an inflator that supplies an inflating gas to the airbag. The airbag includes a cowl cover portion and two pillar cover portions. The inflator includes a main body portion having a substantially columnar outer shape, and a mounting bolt disposed to protrude from an outer peripheral surface of the main body portion in an axis orthogonal direction of the main body portion. The main body portion is mounted on an accommodation site side by using the mounting bolt in a state where the main body portion is inserted into the cowl cover portion while an axial direction is disposed to substantially extend along a left-right direction. A gas flow regulating member suppressing a rearward outflow of an inflating gas discharged from the main body portion is disposed at a position on a rear side of the main body portion inside the cowl cover portion.

6 Claims, 18 Drawing Sheets

(51) Int. Cl.
 *B60R 21/231* (2011.01)
 *B60R 21/2338* (2011.01)
(52) U.S. Cl.
 CPC ............... *B60R 2021/0006* (2013.01); *B60R 2021/23382* (2013.01)
(58) Field of Classification Search
 CPC ...... B60R 2021/23382; B60R 21/2171; B60R 2021/23384
 See application file for complete search history.

(56) References Cited

U.S. PATENT DOCUMENTS

| | | | |
|---|---|---|---|
| 2015/0090516 A1 | 4/2015 | Kitte et al. | |
| 2019/0039560 A1* | 2/2019 | Ozeki | ..................... B60R 21/36 |
| 2019/0299918 A1 | 10/2019 | Ozeki et al. | |
| 2019/0299920 A1* | 10/2019 | Ozeki | .................. B60R 21/201 |

FOREIGN PATENT DOCUMENTS

| | | |
|---|---|---|
| JP | 2002-53000 A | 2/2002 |
| JP | 2015-67182 A | 4/2015 |
| JP | 2019-26222 A | 2/2019 |
| JP | 2019-172170 A | 10/2019 |

\* cited by examiner

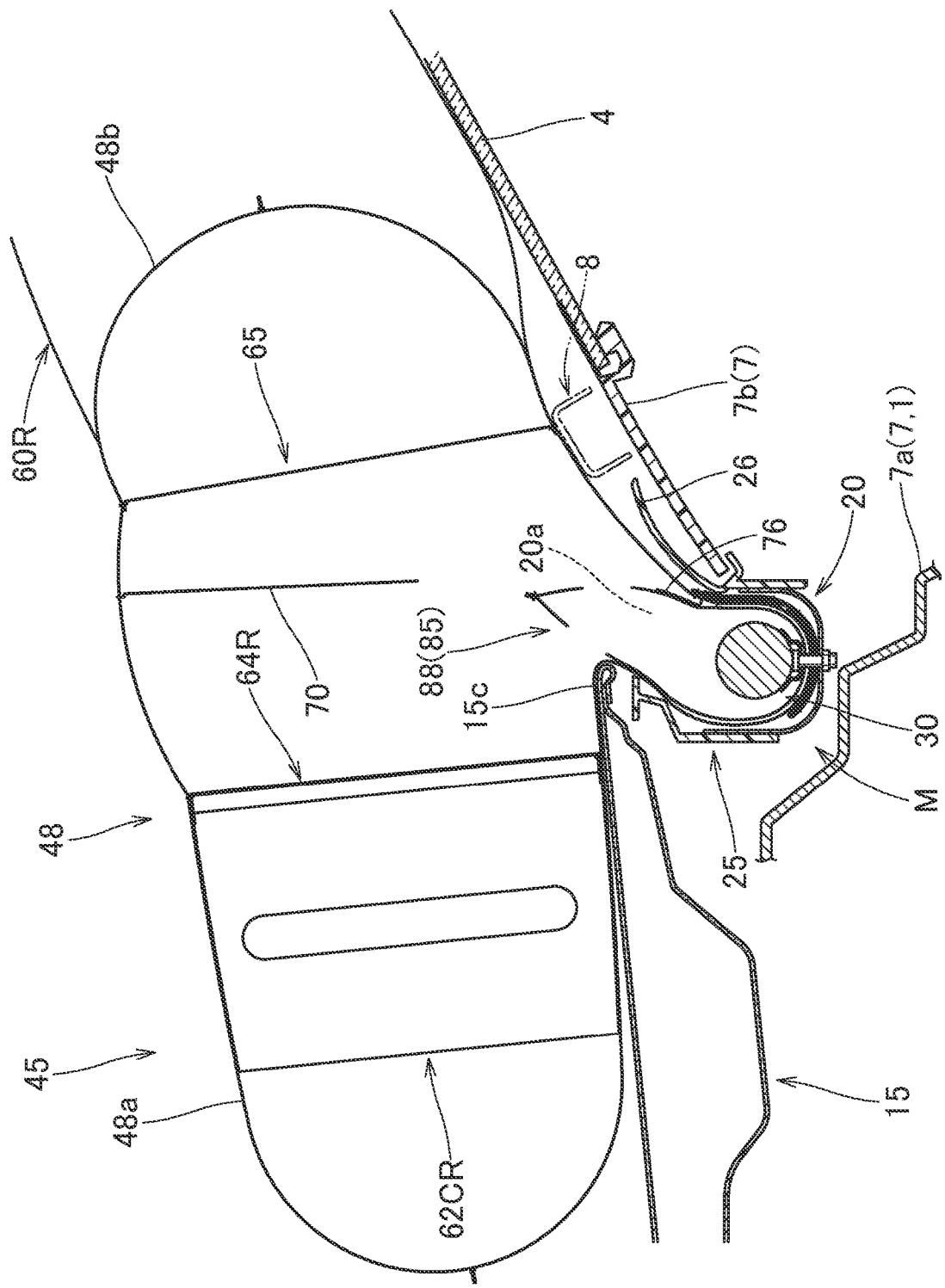

PEDESTRIAN AIRBAG DEVICE

CROSS REFERENCE TO RELATED APPLICATIONS

The present application claims priority from Japanese Patent Application No. 2021-18590 of Ozeki et al., filed on Feb. 8, 2021, the entire disclosure of which is incorporated herein by reference.

BACKGROUND

1. Technical Field

The present disclosure relates to a pedestrian airbag device configured to include an airbag folded and accommodated in an accommodation site disposed near a rear end of a hood panel of a vehicle and an inflator that supplies an inflating gas to the airbag.

2. Description of Related Art

In the related art, as the pedestrian airbag device, as disclosed in JP-A-2019-172170, there is a configuration including an airbag having a cowl cover portion covering an upper surface side of a region from a rear end side of a hood panel to a cowl when inflation is completely, and two pillar cover portions extending rearward from both ends of the cowl cover portion and covering a lower front surface side of right and left front pillars. The pedestrian airbag device in the related art adopts the following configuration to inflate the airbag. An inflator for supplying an inflating gas to the airbag is disposed inside the cowl cover portion, and the inflating gas discharged from the inflator is caused to flow into the airbag.

In this type of the pedestrian airbag device, the airbag is configured to include the cowl cover portion extending long to right and left sides to cover an upper portion of the cowl over a substantially entire region on the right and left sides, and the two pillar cover portions extend rearward from both ends of the cowl cover portion. In the configuration, the airbag has a large volume, and is inflated to cover a wide area. From a viewpoint of quickly protecting a pedestrian who comes into contact with a front end side of a vehicle, it is desirable that a region on a front side covering an upper surface side of the rear end of the hood panel is quickly deployed and inflated in the cowl cover portion. Therefore, in the pedestrian airbag device in the related art, there is room for improvement in that the region on the front side needs to be quickly inflated in the cowl cover portion.

SUMMARY

The present disclosure relates to a pedestrian airbag device having the following configuration.

The pedestrian airbag device includes an airbag that is folded and accommodated in an accommodation site disposed near a rear end of a hood panel of a vehicle, that has a vehicle body side wall portion disposed on a body side when inflation is completed, and a pedestrian side wall portion disposed to face the vehicle body side wall portion, is formed into a bag shape by joining outer peripheral edges of the pedestrian side wall portion and the vehicle body side wall portion to each other over an entire periphery, and that includes a cowl cover portion covering an upper surface side of a region from a rear end side of the hood panel to a cowl when the inflation is completed, and two pillar cover portions extending rearward from both ends of the cowl cover portion and covering a lower front surface side of right and left front pillars, and an inflator supplying an inflating gas to the airbag, and including a main body portion having a substantially columnar outer shape, and a mounting bolt disposed to protrude from an outer peripheral surface of the main body portion in an axis orthogonal direction of the main body portion, in which the main body portion is mounted on the accommodation site by using the mounting bolt in a state where the main body portion is inserted into the cowl cover portion so that the mounting bolt protrudes outward while an axial direction is disposed to substantially extend along a left-right direction. A gas flow regulating member formed of a flexible sheet body, connecting the pedestrian side wall portion and the vehicle body side wall portion to each other, and suppressing a rearward outflow of the inflating gas discharged from the main body portion is disposed at a position on a rear side of the main body portion inside the cowl cover portion.

BRIEF DESCRIPTION OF DRAWINGS

FIG. 18 is a schematic vertical sectional view illustrating a state where the airbag is completely inflated in the pedestrian airbag device of the embodiment.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Hereinafter, an embodiment of the present disclosure will be described with reference to the drawings. A pedestrian airbag device M (hereinafter, abbreviated as an "airbag device") of the embodiment is mounted near a rear end 15c of a hood panel 15 in a vehicle V. As illustrated in FIGS. 1 to 4, the airbag device M of the embodiment is disposed at a position close to the rear end 15c of the hood panel 15, which is an approximately center position in a left-right direction of the vehicle V between right and left front pillars 5L and 5R. In the present specification, unless otherwise specified, description will be made so that front-rear, up-down, and left-right directions respectively coincide with front-rear, up-down, and left-right directions of the vehicle V.

Figure 1:
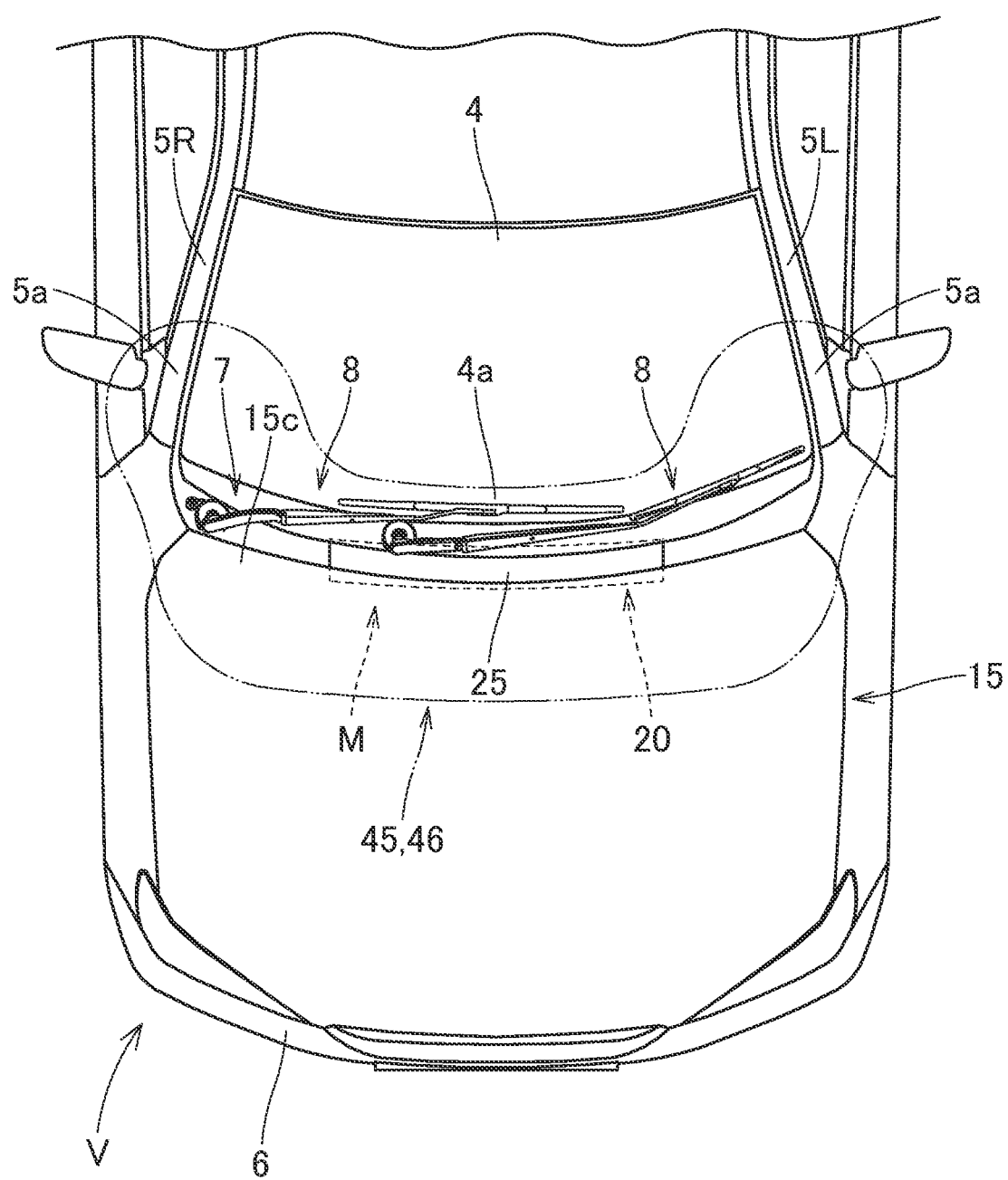
FIG. 1 is a plan view of a vehicle on which a pedestrian airbag device according to an embodiment is mounted.
Figure 2:
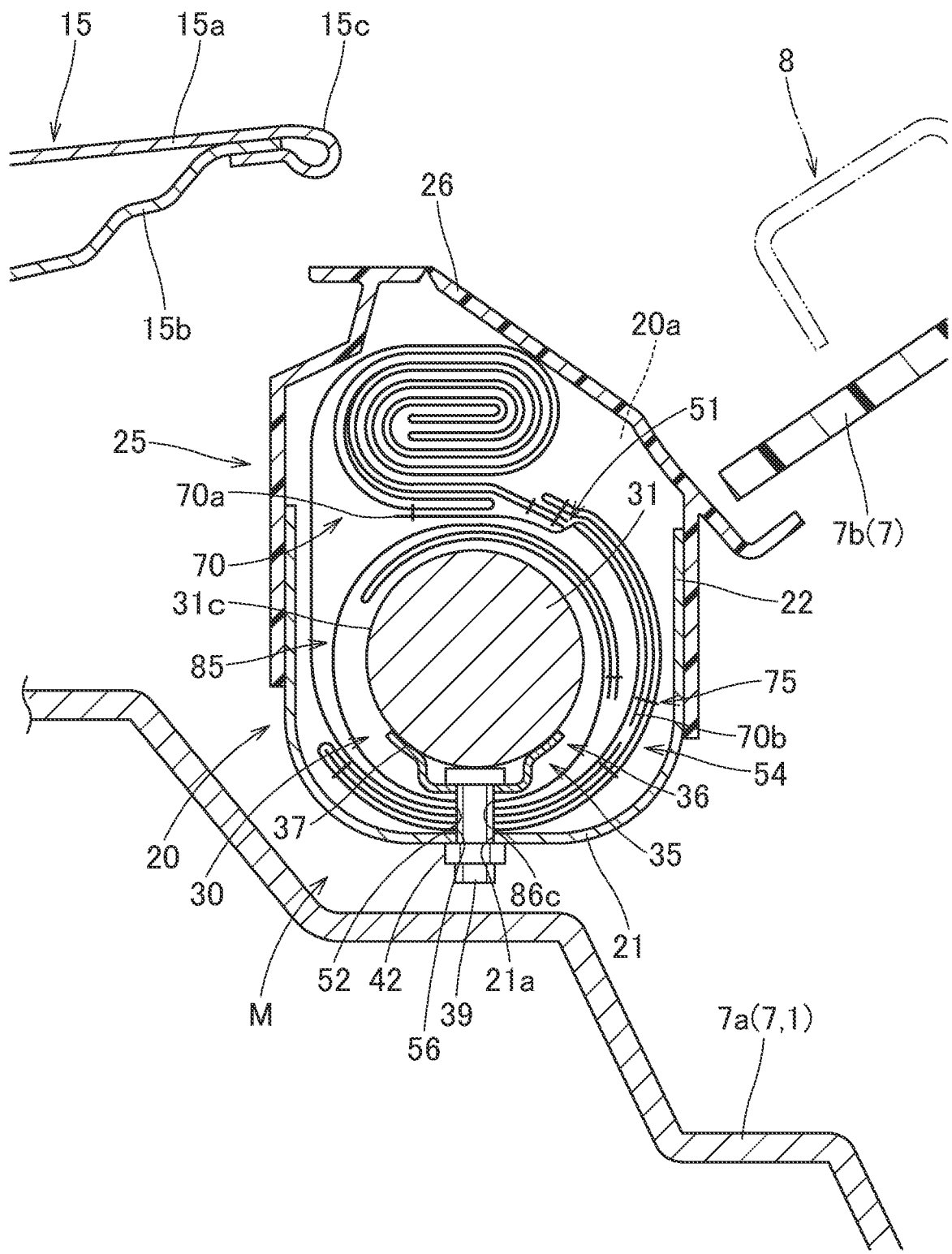
FIG. 2 is a schematic vertical sectional view taken along a front-rear direction of the pedestrian airbag device of the embodiment, and illustrates a site of an inflator.
Figure 3:
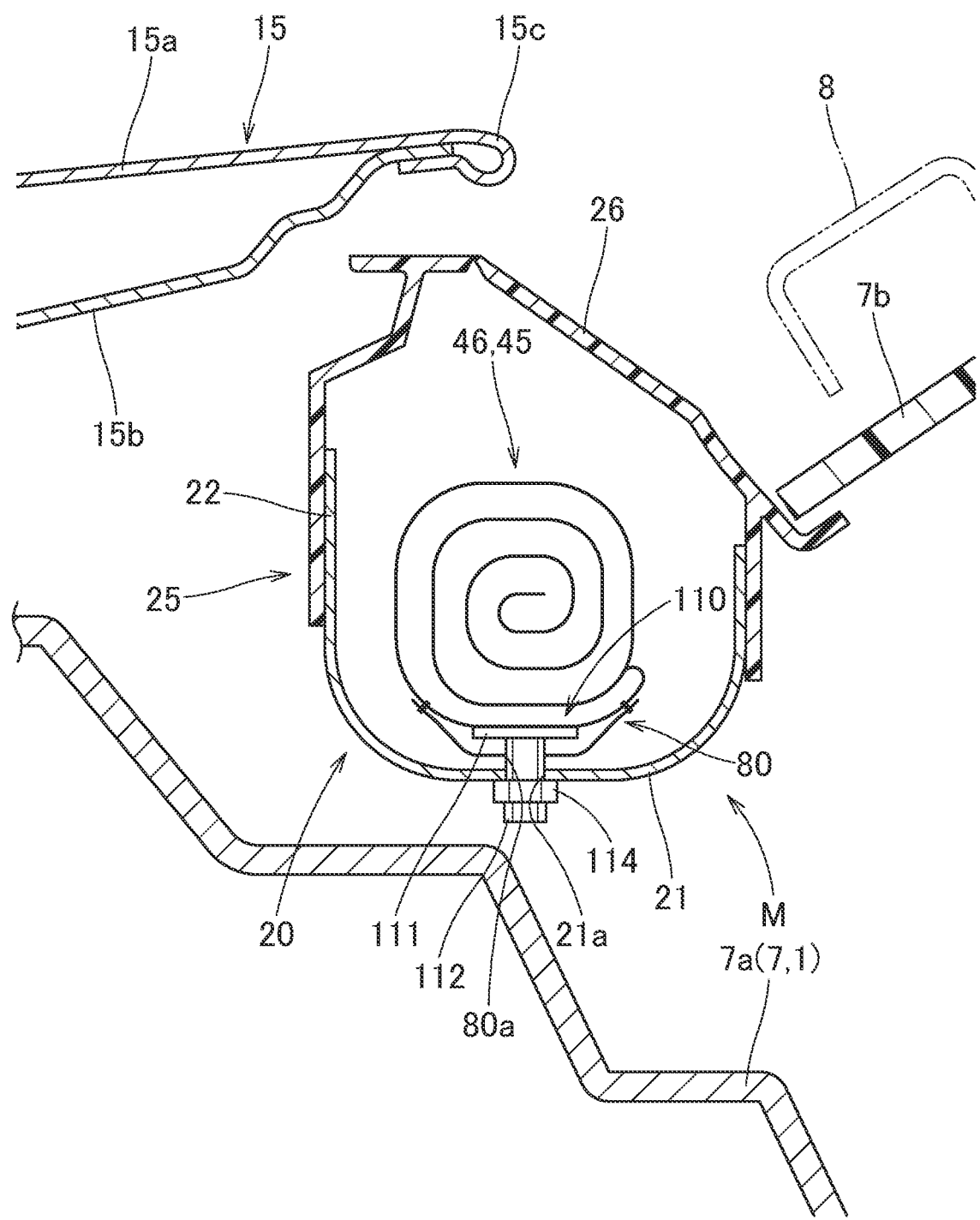
FIG. 3 is a schematic vertical sectional view taken along the front-rear direction of the pedestrian airbag device of the embodiment, and illustrates a site of a mounting bracket.

As illustrated in FIG. 1, the hood panel 15 is disposed to cover an upper side of an engine room in the vehicle V. The hood panel 15 is connected to a body 1 side of the vehicle V so that a front portion is openable and closable by a hinge portion (not illustrated) disposed near the rear end 15c on both right and left edge sides. In a case of the embodiment, the hood panel 15 is formed of a plate material such as a steel plate and an aluminum (aluminum alloy) plate, and includes an outer panel 15a and an inner panel 15b as illustrated in FIGS. 2 and 3. In the hood panel 15, the rear end 15c side is curved in the left-right direction so that a center in the left-right direction is located forward and both right and left end sides are located rearward in accordance with a front windshield 4 (to be described later) (refer to FIG. 1).

As illustrated in FIGS. 2, 3, and 18, a cowl 7 is disposed behind the hood panel 15. The cowl includes a highly rigid cowl panel 7a on the body 1 side and a synthetic resin-made cowl louver 7b located above the cowl panel 7a. The cowl louver 7b is disposed so that a rear end side is connected to a lower portion 4a side of the front windshield 4. The cowl 7 is curved to match a curved shape of the rear end 15c of the hood panel 15 (refer to FIG. 1). In addition, as illustrated in FIG. 1, a wiper 8 is disposed in a site of the cowl 7. As illustrated by a two-dot chain line in FIGS. 2, 3, and 18, the wiper 8 is disposed to protrude upward from the cowl louver 7b. The front pillars 5L and 5R are disposed on right and left outer sides of the front windshield 4.

As illustrated in FIGS. 1 to 4, the airbag device M includes an airbag 45, an inflator 30 that supplies an inflating gas to the airbag 45, a case 20 serving as an accommodation site for accommodating the airbag 45 and the inflator 30, an airbag cover 25 that covers the folded airbag 45, and a mounting bracket 110 that mounts a mounting piece portion 80 (to be described) of the airbag 45 on the case 20.

As illustrated in FIGS. 2 and 3, the case 20 serving as the accommodation site is formed of sheet metal, and has a substantially box shape including a bottom wall portion 21 and a peripheral wall portion 22 extending upward from the bottom wall portion 21, having an open upper end side, and having a substantially square tubular shape. In addition, the case 20 has a configuration in which the inflated airbag 45 protrudes from a protrusion opening 20a on the upper end side. The bottom wall portion 21 has mounting holes 21a for fixing and mounting nuts 42 and 114 by respectively inserting mounting bolts 39 for mounting the inflator 30 and mounting bolts 112 for mounting the mounting piece portion 80 of the airbag 45 (refer to FIGS. 2 to 4). In a case of the embodiment, the case 20 is disposed so that a front side region is located directly below the rear end 15c of the hood panel 15 and a rear side region is located rearward of the hood panel 15. The case 20 is mounted on the cowl panel 7a on the body 1 side by using a bracket (not illustrated).

The airbag cover 25 is formed of a soft synthetic resin such as a polyolefin-based thermoplastic elastomer (TPO). The airbag cover 25 has a door portion 26 disposed to cover the protrusion opening 20a on the upper end side of the case 20, and pushed by the airbag 45 to be openable rearward when the airbag 45 is deployed and inflated (refer to FIGS. 2, 3, and 18). The airbag cover 25 is mounted on the case 20 at a predetermined location by using mounting means (not illustrated).

The inflator 30 includes an inflator main body 31 serving as a main body portion and a mounting bracket 35 for mounting the inflator main body 31 on the case 20.

Figure 4:
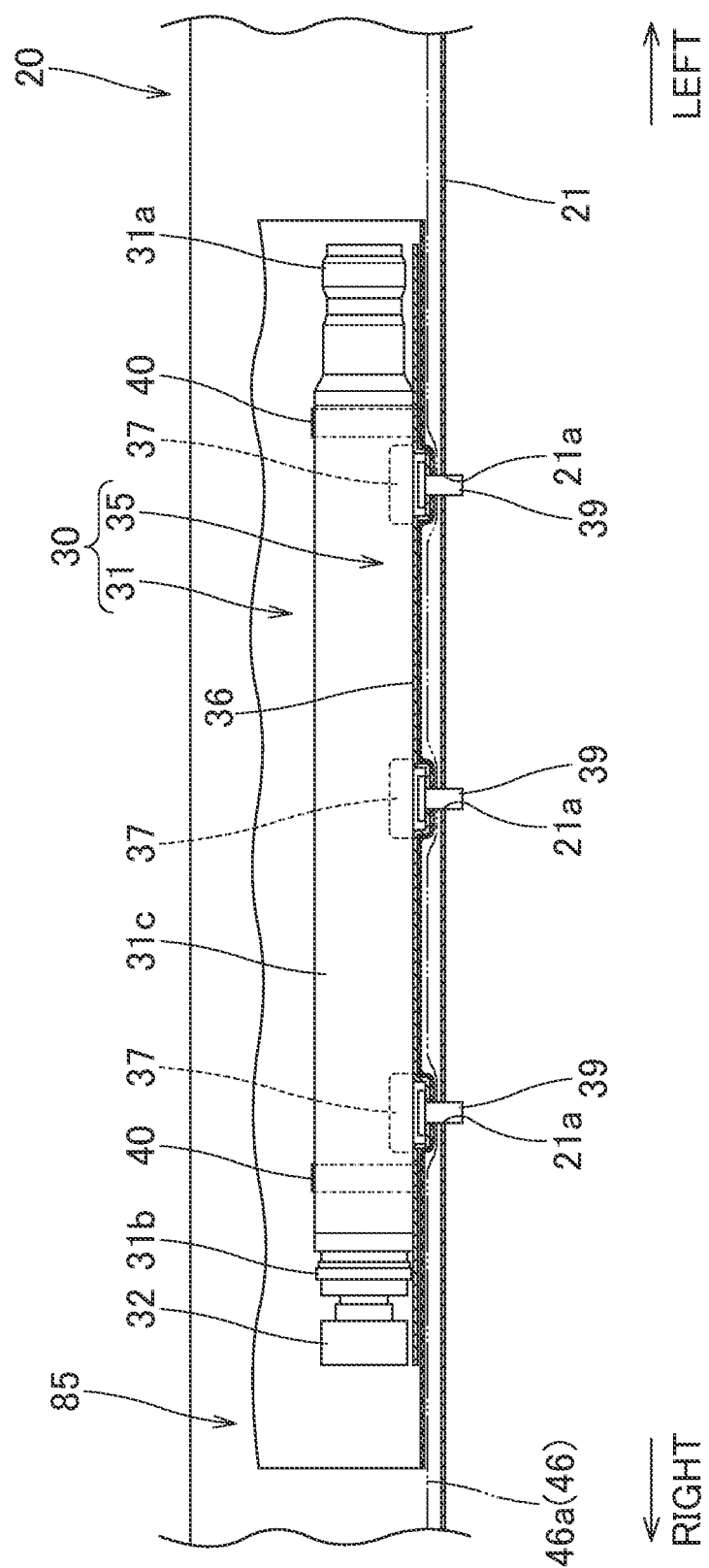
FIG. 4 is a schematic vertical sectional view taken along a left-right direction which illustrates the site of the inflator in the pedestrian airbag device of the embodiment.
Figure 5:
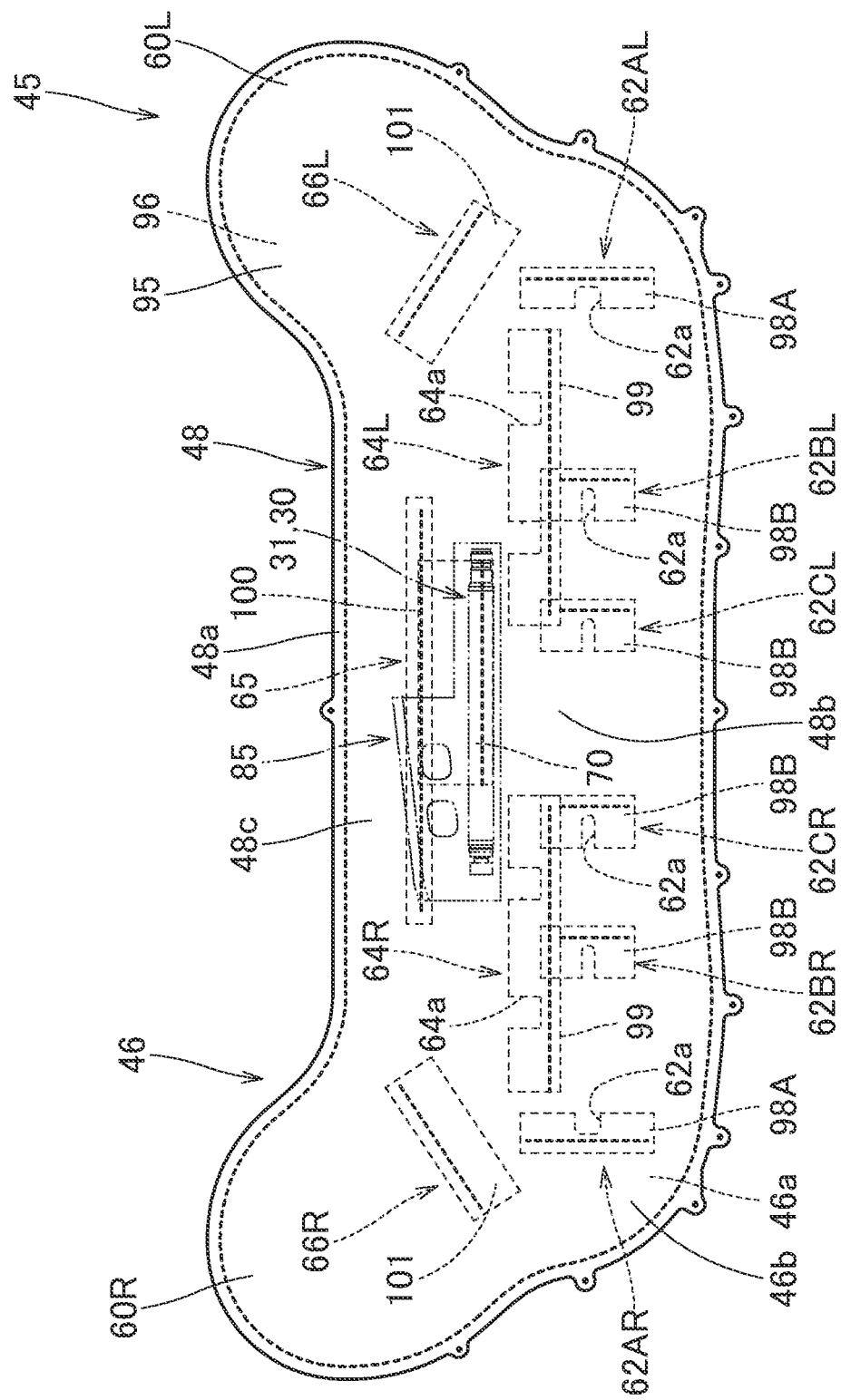
FIG. 5 is a plan view illustrating a state where an airbag used in the pedestrian airbag device of the embodiment is flatly deployed.

The inflator main body 31 serving as the main body portion has a substantially columnar outer shape. As illustrated in FIGS. 2 and 4, the inflator main body 31 is disposed inside a substantially central position in front-rear and left-right directions of a cowl cover portion 48 (to be described later) in the airbag 45 so that an axial direction substantially extends along the left-right direction. Specifically, the inflator main body 31 is disposed at a position slightly rearward of the center in the front-rear direction of the cowl cover portion 48 (refer to a two-dot chain line in FIGS. 5 and 6). As illustrated in FIG. 4, the inflator main body 31 is configured so that a gas discharge portion 32 capable of discharging the inflating gas is disposed on one end side (in a case of the embodiment, a right end 31b side) in the axial direction, and is electrically connected to an operation circuit (not illustrated) via a lead wire (not illustrated) extending from the other end side (left end 31a side) in the axial direction. A sensor (not illustrated) capable of detecting collision with a pedestrian is disposed in a front bumper 6 (refer to FIG. 1) of the vehicle V on which the airbag device M of the embodiment is mounted. The operation circuit activates the inflator main body 31 when the sensor detects the collision between the vehicle V and the pedestrian, based on a signal from the sensor.

As illustrated in FIGS. 2 and 4, the mounting bracket 35 for mounting the inflator main body 31 on the case 20 includes a holding portion 36 that holds the inflator main body 31 and a plurality of (three in a case of the embodiment) mounting bolts 39 protruding downward from the holding portion 36. The holding portion 36 is formed of sheet metal, and has a strip shape extending substantially along the left-right direction (axial direction of the inflator main body 31) to support a lower surface side of the inflator main body 31. In the holding portion 36, support piece portions 37 that support the inflator main body 31 protrude from both front and rear sides, and are formed at a plurality of locations (three locations in a case of the embodiment) along the left-right direction. Each of the support piece portions 37 is formed to be capable of supporting an outer peripheral surface of the inflator main body 31, and be inclined to extend upward from front and rear edge portions of the holding portion 36 while a tip faces outward in the front-rear direction. Each of the support piece portions 37 has a symmetrical shape in the front-rear direction (refer to FIG. 2). In a case of the embodiment, as illustrated in FIG. 4, each of the support piece portion 37 is formed at a position corresponding to the mounting bolt 39. The mounting bolts 39 are formed to respectively protrude downward at three locations such as both right and left end sides of the holding portion 36 and a substantially central location in the left-right direction. In the embodiment, the mounting bracket 35 is configured to mount the inflator main body 31 by winding clamps 40 from an outer peripheral side in a state where the inflator main body 31 is held by the holding portion 36. In a case of the embodiment, the clamps 40 are disposed at two locations on both right and left end sides of the holding portion 36 (refer to FIG. 4).

That is, in the inflator 30 of the embodiment, as illustrated in FIGS. 3 and 4, the mounting bolts 39 are disposed to protrude from an outer peripheral surface 31c of the inflator main body 31 serving as the main body portion in an axis orthogonal direction (downward direction) of the inflator main body 31. The inflator 30 is inserted into the airbag 45 by using the clamps 40 in a state where the inflator main body 31 is mounted on the mounting bracket 35, and is mounted on the bottom wall portion 21 of the case 20. Specifically, the inflator main body 31 and the holding portion 36 in the mounting bracket 35 are inserted into the airbag 45 so that the mounting bolts 39 protrude outward from insertion holes 52 and mounting holes 56 (to be described later). Specifically, the inflator 30 causes each of the mounting bolts 39 protruding from a lid panel 54 (to be described later) in the airbag 45 to protrude from the bottom wall portion 21 of the case 20, and mounts the mounting bolts 39 together with the airbag 45 on the case 20 by fixing the nuts 42 (refer to FIG. 2). In addition, in the embodiment, the inflator 30 is accommodated inside the airbag 45 by covering an outer peripheral side of the inflator main body 31 and the holding portion 36 in the mounting bracket 35 with a flexible tubular inner tube 85. The inflator 30 (inflator main body 31) is accommodated at a position slightly rearward of the center in the front-rear direction of the cowl cover portion 48 in the airbag 45 so that the center in the axial direction substantially coincides with the center in the left-right direction of the bag main body 46 (refer to FIGS. 5 and 6). More specifically, the inflator 30 (inflator main body 31) is accommodated inside the cowl cover portion 48 so that the right end 31b side on which the gas discharge portion 32 is disposed is located rightward of the lid panel 54 (that is, rightward of an insertion slit 51 (to be described later)) and the left end 31a side is located rightward of a left edge of the lid panel 54 (refer to FIG. 8).

As illustrated in FIGS. 5 to 10, the airbag 45 includes a bag main body 46 inflated by causing the inflating gas inside, tethers 62AL, 62BL, 62CL, 62AR, 62BR, 62CR, 64L, 64R, 65, 66L, and 66R for regulating a thickness of the bag main body 46 when inflation is completed, a gas flow regulating member 70 for regulating a flow of the inflating gas into the bag main body 46, two mounting piece portions 80 (80L and 80R) for mounting the vehicle body side wall portion 46a side of the bag main body 46 on the case 20, and the inner tube 85 that covers the outer peripheral side of the inflator 30 inside the bag main body 46. In addition, the bag main body 46 has the insertion opening portion 50 for inserting the inflator 30 into the bag main body 46.

An outer shape of the bag main body 46 when the inflation is completed is a substantially U-shape which is wide in the left-right direction when viewed from a front surface side. The bag main body 46 includes the cowl cover portion 48 disposed substantially along a lower portion 4a of the front windshield 4 and substantially along the left-right direction, and pillar cover portions 60L and 60R respectively extending rearward from both ends of the cowl cover portion 48 and covering the lower portion 5a side of the front surface of the right and left front pillars 5L and 5R. In addition, the bag main body 46 has a vehicle body side wall portion 46a disposed on the body 1 side when the inflation is completed, and a pedestrian side wall portion 46b disposed to face the vehicle body side wall portion 46a, and has a bag shape by joining (sewing) outer peripheral edges of the vehicle body side wall portion 46a and the pedestrian side wall portion 46b to each other over an entire periphery.

Figure 17:
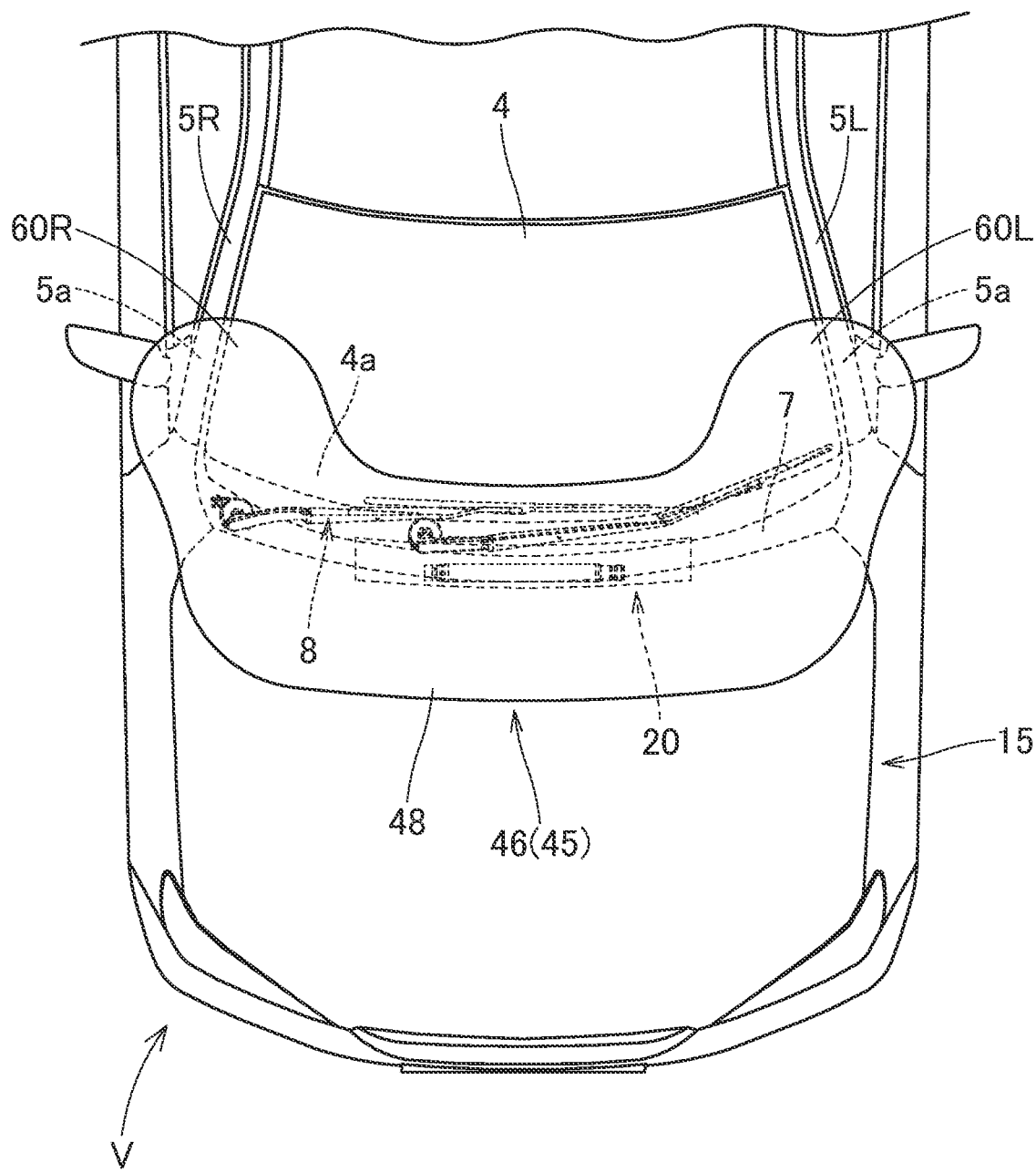
FIG. 17 is a schematic plan view illustrating a state where the airbag is completely inflated in the pedestrian airbag device of the embodiment.

The cowl cover portion 48 covers an upper surface side of a region from the rear end 15c of the hood panel 15 to the cowl 7 when the inflation is completed. Specifically, in a case of the embodiment, when the inflation is completed, the cowl cover portion 48 covers an upper surface side (front surface side) of a region from a site on the rear end 15c side of the hood panel 15 to the lower portion 4a side of the front windshield 4 through the cowl 7, over a substantially entire region including the wiper 8 in a vehicle width direction (left-right direction) (refer to FIGS. 17 and 18). In the airbag 45 of the embodiment, the inflator 30 is accommodated at a substantially central position in the front-rear and left-right directions in the cowl cover portion 48. Specifically, in the vehicle body side wall portion 46a of the airbag 45, a substantially central region in the front-rear and left-right directions of the cowl cover portion 48 forms the insertion opening portion 50 for inserting the inflator 30 into the airbag 45 (refer to FIGS. 6 and 8).

Figure 8:
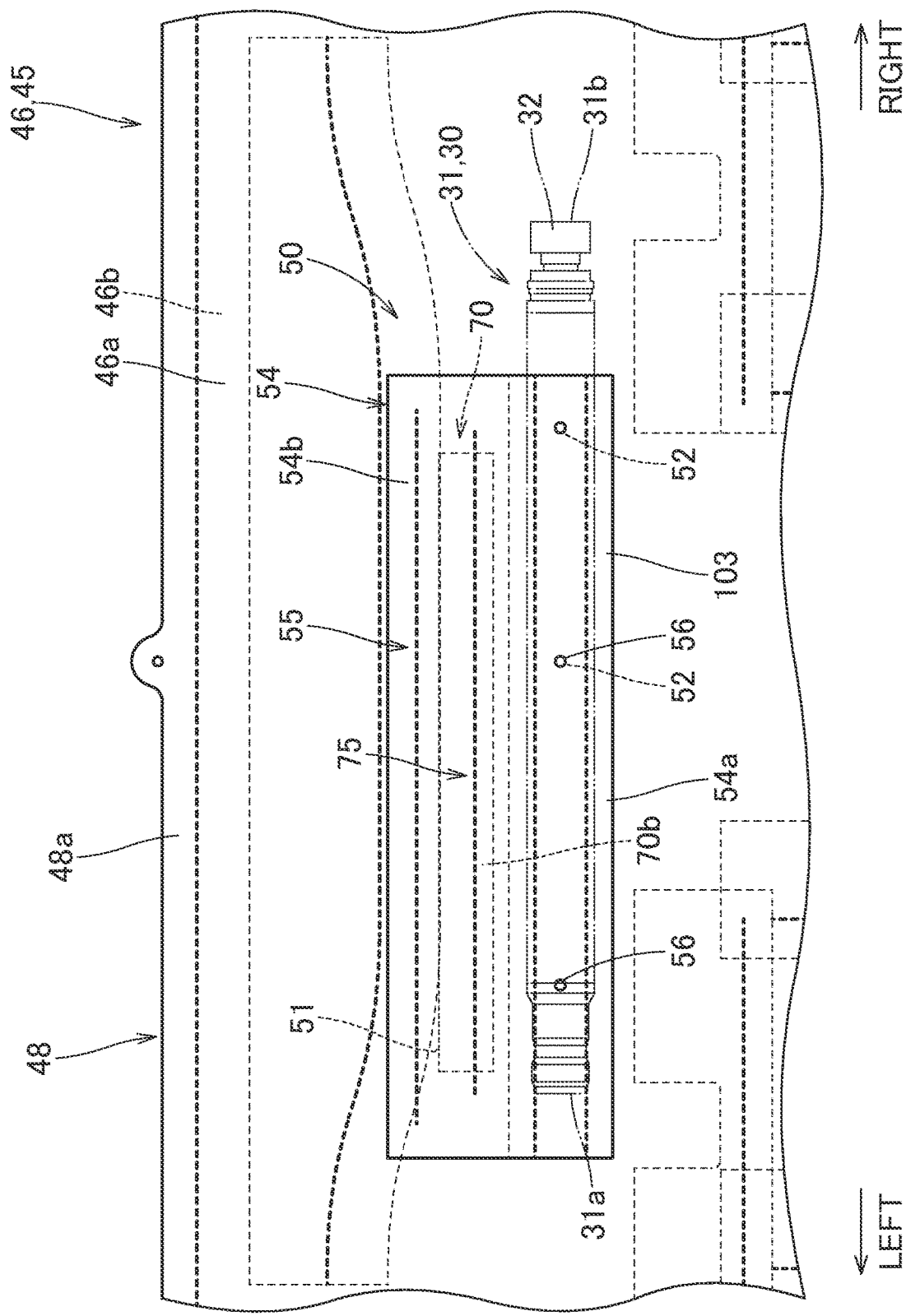
FIG. 8 is a partially enlarged bottom view illustrating the insertion opening portion in the airbag in FIG. 5.
Figure 9:
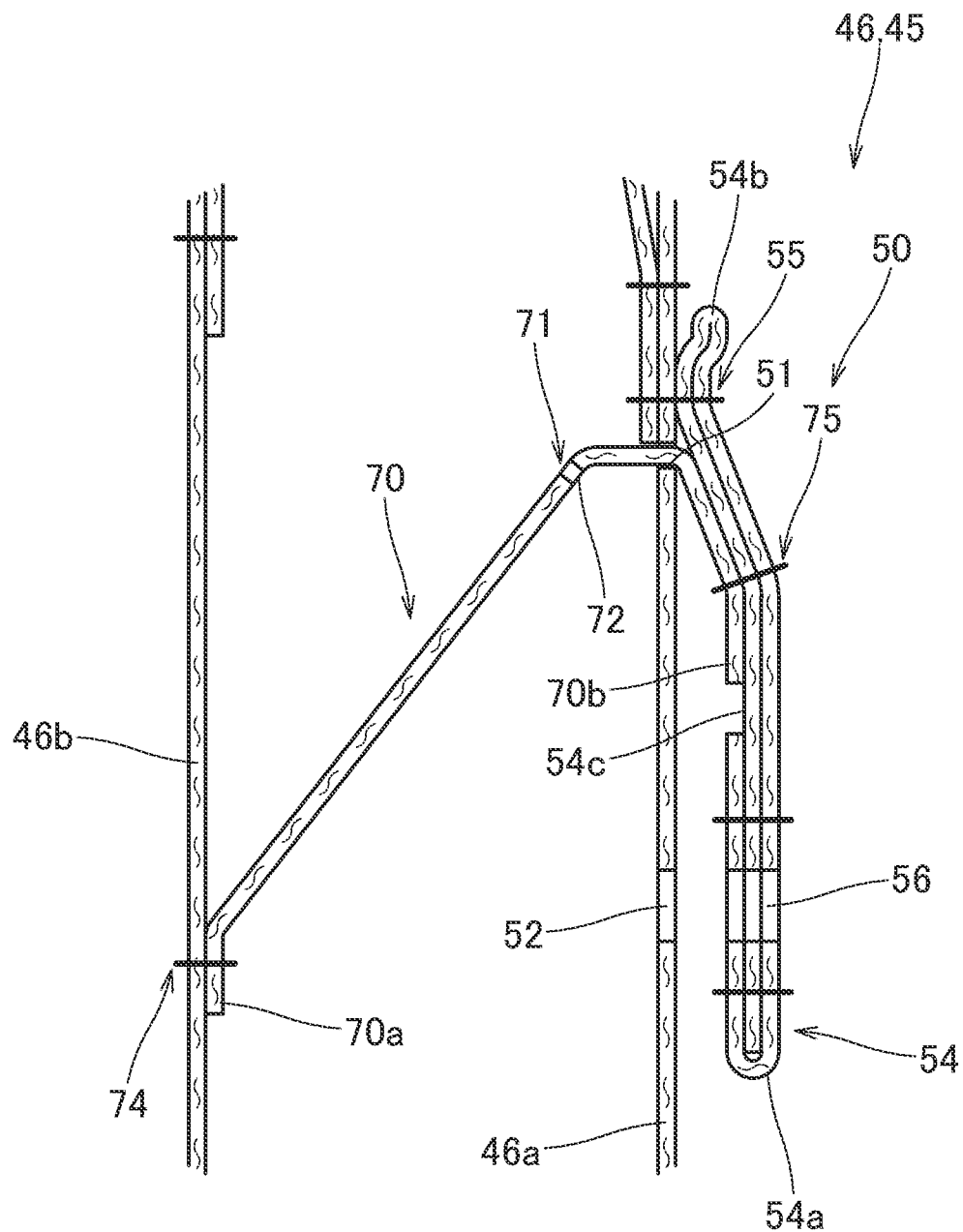
FIG. 9 is a partially enlarged sectional view illustrating a site of the insertion opening portion in the airbag in FIG. 5.
Figure 10:
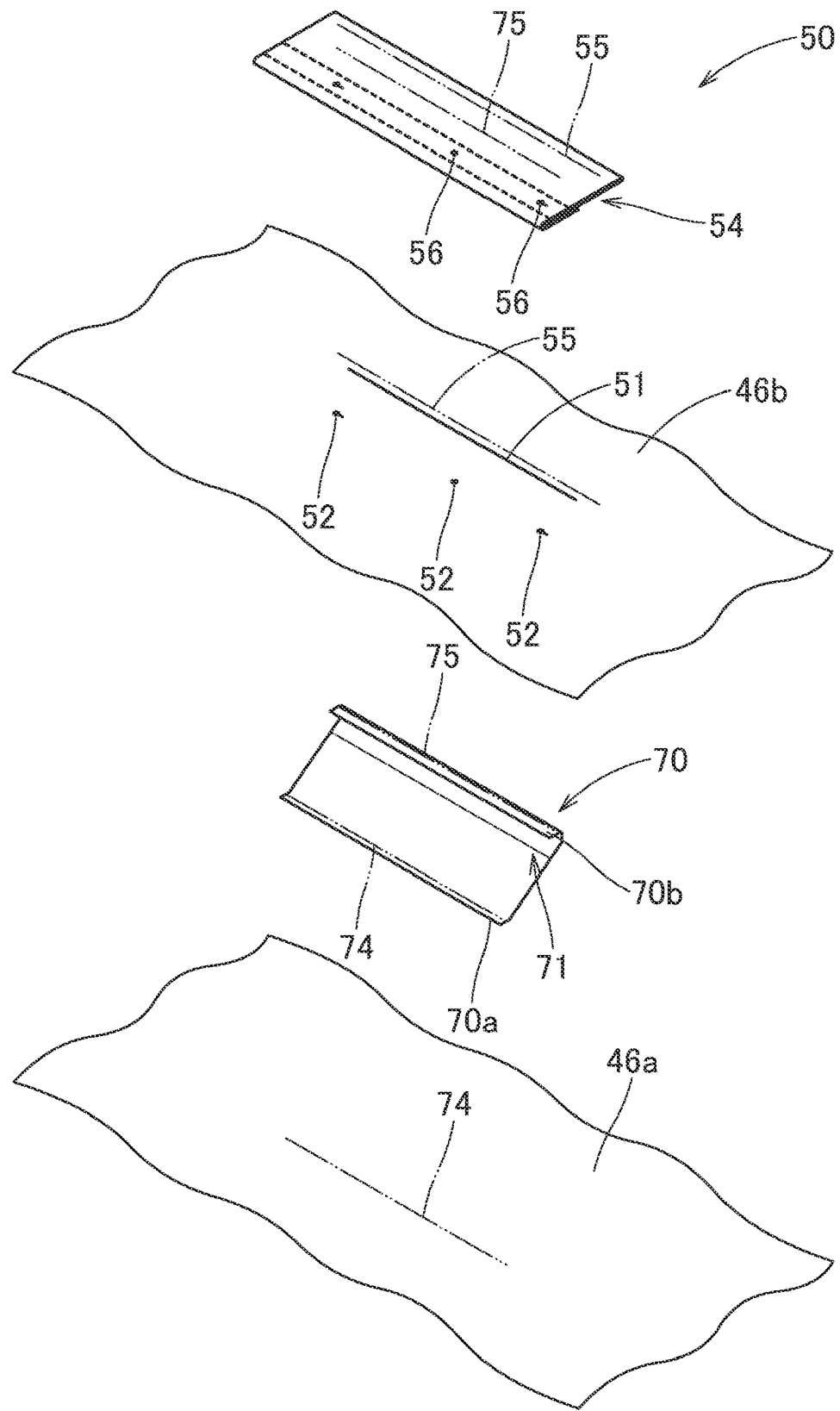
FIG. 10 is a schematic exploded perspective view illustrating the site of the insertion opening portion in the airbag in FIG. 5.
Figure 12:
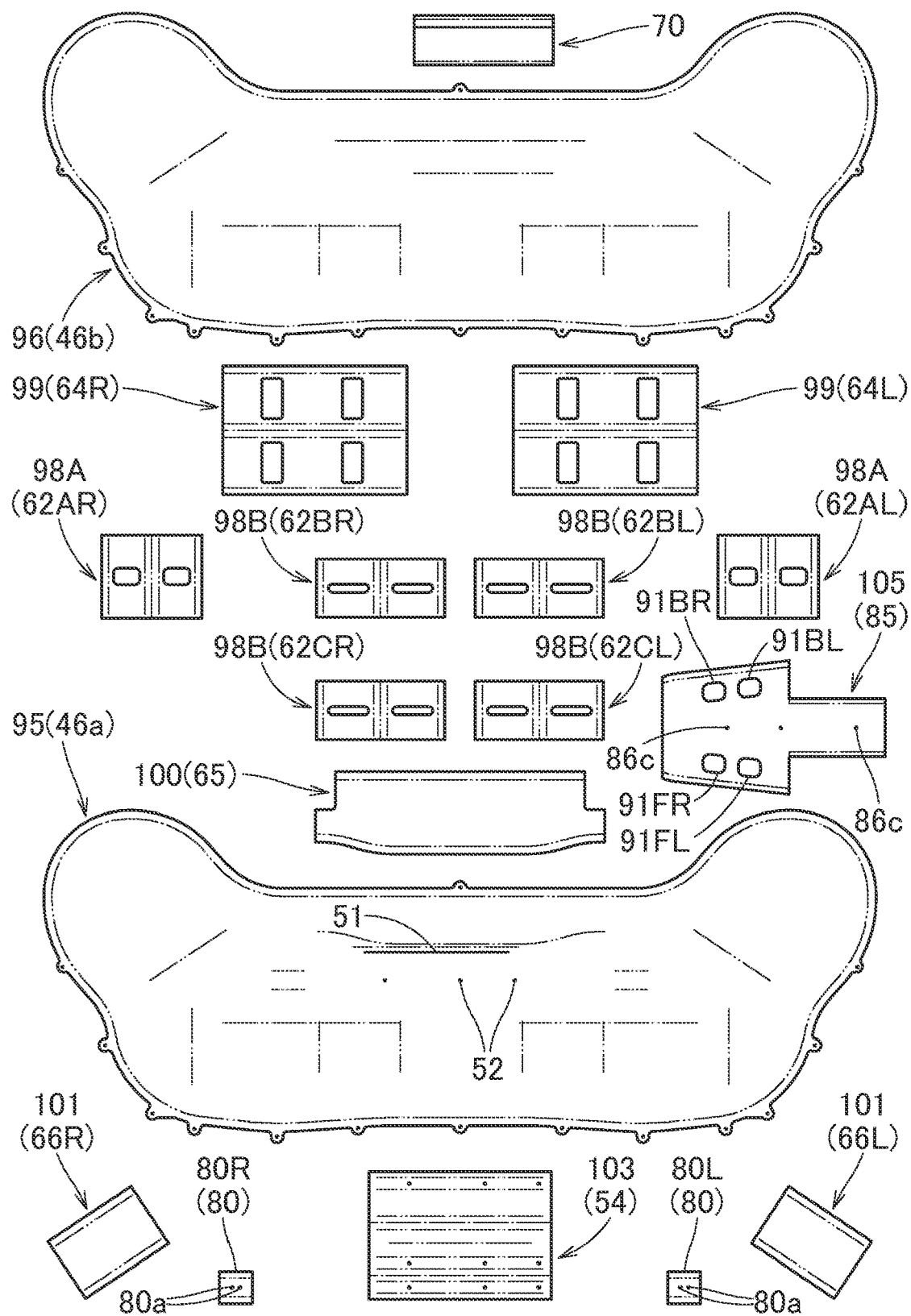
FIG. 12 is a plan view in which base materials forming the airbag in FIG. 5 are aligned.

Specifically, the inflator 30 is accommodated at a position slightly rearward of the center in the front-rear direction of the cowl cover portion 48. The insertion opening portion 50 is also disposed at the position slightly rearward of the center in the front-rear direction of the cowl cover portion 48. Specifically, in the vehicle body side wall portion 46a, the insertion opening portion 50 is disposed in a region between front side tethers 64L and 64R and rear side tether 65 (to be described later). As illustrated in FIGS. 8 to 10, the insertion opening portion 50 includes an insertion slit 51 formed in the vehicle body side wall portion 46a, insertion holes 52 for causing the mounting bolts 39 of the inflator 30 to protrude, and a lid panel 54 for closing the insertion slit 51 from an outer peripheral side. The insertion slit 51 is used for inserting the inflator 30 (inflator main body 31), and is formed in a linear shape substantially extending along the left-right direction to substantially extend along the axial direction of the inflator main body 31. A length dimension of the insertion slit 51 is set to be smaller than a length dimension of the inflator main body 31 (refer to FIG. 8). In a case of the embodiment, the insertion slit 51 is disposed so that the center of the insertion slit 51 is shifted leftward of the center in the left-right direction of the bag main body 46 (which substantially coincides with the position of the insertion hole 52 in the center) (refer to FIG. 8). The insertion holes 52 cause the mounting bolts 39 of the inflator 30 to protrude, and are disposed at a position separated from the insertion slit 51 on a side in a substantially orthogonal direction, and in a case of the embodiment, on a front side of the insertion slit 51. The insertion holes 52 are formed to correspond to the mounting bolts 39 at three locations along the left-right direction. The lid panel 54 is a separate member formed of a flexible sheet body, and has a substantially rectangular outer shape in which a side in the left-right direction is wide so that the insertion slit 51 can be closed on the outer peripheral side of the vehicle body side wall portion 46a. The lid panel 54 is also disposed so that the center in the left-right direction is shifted leftward of the center in the left-right direction in the bag main body 46. In a case of the embodiment, the lid panel 54 is sewn (joined) by using a suture so that the rear end 54*b* side is a side separated from the insertion hole 52 across the insertion slit 51 in the vehicle body side wall portion 46*a*, that is, so that a joining site 55 is formed in a rear region of the insertion slit 51 in the vehicle body side wall portion 46*a*. The mounting holes 56 for causing the mounting bolts 39 to protrude to correspond to the insertion holes 52 are formed on a front end 54*a* side of the lid panel 54. The joining site 55 for sewing (joining) the rear end 54*b* side of the lid panel 54 to the vehicle body side wall portion 46*a* is continuously formed over the entire region in the left-right direction of the lid panel 54. In a case of the embodiment, as illustrated in FIG. 12, the lid panel 54 is formed of a lid panel base fabric 103.

In a case of the embodiment, as tethers that regulate the thickness of the bag main body 46 when the inflation is completed, front-rear tethers 62AL, 62BL, 62CL, 62AR, 62BR, and 62CR, the front side tethers 64L and 64R, the rear side tether 65, and end side tethers 66L and 66R are disposed inside the bag main body 46. Each of the front-rear tethers 62AL, 62BL, 62CL, 62AR, 62BR, and 62CR, the front side tethers 64L and 64R, the rear side tether 65, and the end side tethers 66L and 66R connects the pedestrian side wall portion 46*b* and the vehicle body side wall portion 46*a* to each other, thereby regulating a separation distance between the pedestrian side wall portion 46*b* and the vehicle body side wall portion 46*a* when the inflation is completed (refer to FIG. 18). The front side tethers 64L and 64R are disposed to substantially extend along the left-right direction on the front side of the insertion opening portion 50, at positions slightly forward of the center in the front-rear direction of the cowl cover portion 48. The rear side tether 65 is disposed to substantially extend along the left-right direction on the rear side of the insertion opening portion 50. The rear side tether 65 is configured to have different width dimensions so that the joining site to the vehicle body side wall portion 46*a* is wider in the left-right direction than the joining site to the pedestrian side wall portion 46*b* (refer to FIGS. 5, 6, and 12). The front-rear tethers 62AL, 62BL, 62CL, 62AR, 62BR, and 62CR are respectively disposed in one location at a position outward in the left-right direction of each of the front side tethers 64L and 64R, and in two locations on the front side of each of the front side tethers 64L and 64R, and are aligned to substantially extend along the front-rear direction, on a side in the left-right direction. The front-rear tethers 62AL and 62AR disposed outward in the left-right direction of the front side tethers 64L and 64R are disposed to extend rearward of the front side tethers 64L and 64R, and the width dimensions are set to be larger than those of the remaining front-rear tethers 62BL, 62CL, 62BR, and 62CR. In a case of the embodiment, opening portions 62*a* and 64*a* which are open so that the inflating gas can flow are respectively formed in the front side tethers 64L and 64R and the front-rear tethers 62AL, 62BL, 62CL, 62AR, 62BR, and 62CR (refer to FIGS. 5 and 12). In each of the front-rear tethers 62AL, 62BL, 62CL, 62AR, 62BR, and 62CR, the opening portions 62*a* are formed one by one as elongated holes substantially extending along an up-down direction. In each of the front side tethers 64L and 64R, opening portions 64*a* are formed two by two in an elongated hole shape substantially extending along the up-down direction. The end side tethers 66L and 66R are disposed to be inclined in the left-right direction so that the insides in the left-right direction are respectively located rearward near a boundary site between the cowl cover portion 48 and each of the pillar cover portions 60L and 60R. The front-rear tethers 62AL, 62BL, 62CL, 62AR, 62BR, and 62CR, the front side tethers 64L and 64R, the rear side tether 65, and the end side tethers 66L and 66R are symmetrically disposed inside the bag main body 46.

The gas flow regulating member 70 that regulates a flow of the inflating gas flowing into the bag main body 46 is disposed at a position rearward of the inflator main body 31 inside the cowl cover portion 48 (refer to FIG. 2). The gas flow regulating member 70 is formed of a flexible sheet body, and is configured to connect the pedestrian side wall portion 46*b* and the vehicle body side wall portion 46*a* to each other. Specifically, the gas flow regulating member 70 is disposed inside a disposition region of the insertion opening portion 50. In a case of the embodiment, the width dimension of the gas flow regulating member 70 on a side in a direction extending along the axial direction of the inflator main body 31 (side in the left-right direction) is substantially the same as the length dimension of the insertion slit 51 in the insertion opening portion 50. And, the gas flow regulating member 70 is configured to include a strip-shaped body which is wide in the left-right direction. In the gas flow regulating member 70, an upper end 70*a* side is sewn (joined) to the pedestrian side wall portion 46*b* to form the joining site 74, and a lower end 70*b* side is joined to an inner peripheral surface 54*c* side of the lid panel 54 so that the lower end 70*b* side is inserted into the insertion slit 51. The joining site 75 that joins the lower end 70*b* side of the gas flow regulating member 70 to the inner peripheral surface 54*c* side of the lid panel 54 is disposed at a position rearward of the mounting hole 56, which is a position slightly rearward of the center of the lid panel 54 in the front-rear direction. The joining site 75 is continuously formed over the entire region in the width direction of the gas flow regulating member 70. The joining site 74 that joins the upper end 70*a* side of the gas flow regulating member 70 to the pedestrian side wall portion 46*b* is also continuously formed over the entire region in the width direction of the gas flow regulating member 70.

The gas flow regulating member 70 is disposed to cover the rear side of the inflator main body 31. However, the width dimension on a side in the left-right direction is set to be substantially the same as the length dimension of the insertion slit 51 in the insertion opening portion 50, and the gas flow regulating member 70 is inserted into the insertion slit 51. In other words, the gas flow regulating member 70 is disposed so that the width dimension is set to be smaller than the length dimension of the inflator main body 31 and the gas flow regulating member 70 partially covers the rear side of the inflator main body 31. Specifically, the gas flow regulating member 70 is disposed to cover the rear side of the region excluding the right end 31*b* (gas discharge portion 32) side of the inflator main body 31 so that the center in the left-right direction is shifted leftward of the center (center in the axial direction of the inflator main body 31) in the left-right direction of the bag main body 46 (refer to FIG. 7). In a case of the embodiment, the width dimension of the gas flow regulating member 70 on the side in the left-right direction (length dimension of the insertion slit 51) is set to approximately ⅔ of the length dimension of the inflator main body 31. In addition, in the gas flow regulating member 70, the width dimension on the side in the left-right direction is set to be smaller than the width dimension on the side in the left-right direction of the inner tube 85 (length dimension of the mounting side portion 86) (refer to FIG. 7). In a state where the inflator 30 is accommodated inside the bag main body 46, the gas flow regulating member 70 is disposed to cover the rear side of the central region excluding both right and left end sides in the inner tube 85. Specifically, the gas flow regulating member 70 is configured to cover a rear side of an outflow opening 89L on the left end 88a side and a gas outlet 91BL on the left side in a gas flow straightening portion 88 (to be described later) in the inner tube 85 (refer to FIGS. 7 and 16). At an initial inflating stage of the bag main body 46 when the airbag 45 is deployed and inflated, the gas flow regulating member 70 suppresses a rearward outflow of an inflating gas G discharged from the gas discharge portion 32 of the inflator main body 31 and flowing out from the outflow opening 89L and the gas outlet 91BL, and deflects the outflow toward both right and left sides (refer to FIG. 16).

Figure 13:
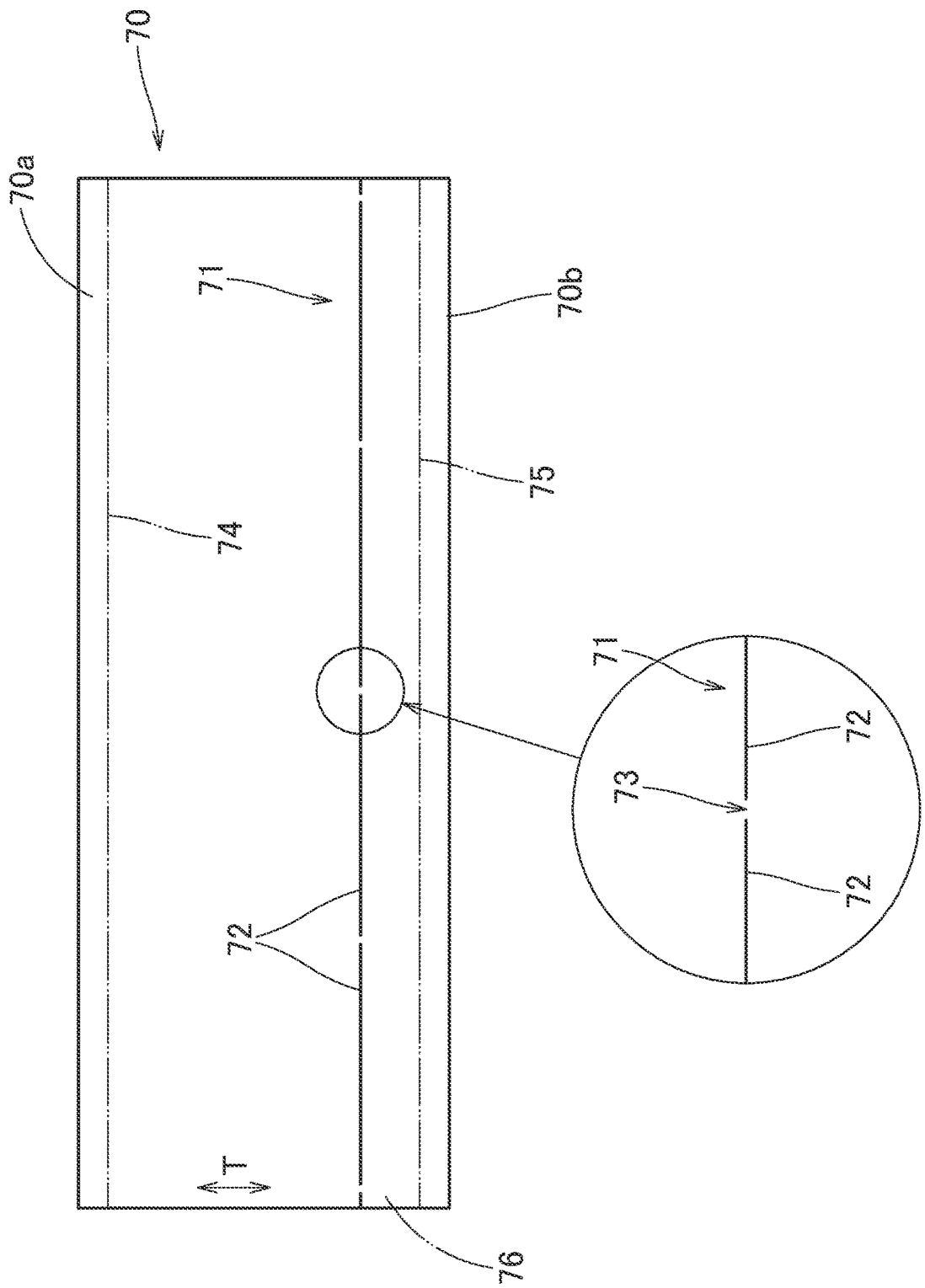
FIG. 13 is a plan view of a gas flow regulating member.

In addition, the gas flow regulating member 70 is dividable over the entire length in the left-right direction to release a connection state between the pedestrian side wall portion 46b and the vehicle body side wall portion 46a, when tension acts due to separation of the pedestrian side wall portion 46b from the vehicle body side wall portion 46a side during the inflation of the airbag 45. Specifically, in the gas flow regulating member 70, a planned breakable portion 71 configured to have an intermittent cut substantially extending along the left-right direction is disposed near the lower end 70b (refer to FIGS. 10 and 13). As illustrated in FIG. 13, the planned breakable portion 71 is formed over the entire region of the gas flow regulating member 70 in the left-right direction. When the airbag 45 is inflated, a peripheral edge site (connection site 73) between the cuts 72 is broken. In this manner, the gas flow regulating member 70 is divided over the entire region (entire length) in the left-right direction, and a connection state between the pedestrian side wall portion 46b and the vehicle body side wall portion 46a side (lid panel 54 side) by the gas flow regulating member 70 is released (refer to FIGS. 15B and 18). The planned breakable portion 71 is formed at a position where a lower end side site 76 (site on the vehicle body side wall portion) formed after the gas flow regulating member 70 is divided (after the planned breakable portion 71 is broken) when the airbag 45 is inflated can be disposed below the upper surface of the hood panel 15. Specifically, the planned breakable portion 71 is disposed at a position near the lower end 70b of the gas flow regulating member 70, and is disposed at a position near the insertion slit 51 in a state where the lower end 70b side is joined to the lid panel 54 (refer to FIG. 9). Specifically, in a case of the embodiment, the planned breakable portion 71 is disposed at a position which is approximately ⅓ of the lower side of the gas flow regulating member 70 (refer to FIG. 13). After the planned breakable portion 71 is broken, the lower end side site 76 of the gas flow regulating member 70 is disposed below the rear end 15c of the hood panel 15, and is disposed at a position below a tip of the open door portion 26 in the airbag cover 25 (refer to FIGS. 15B and 18).

Figure 15A:
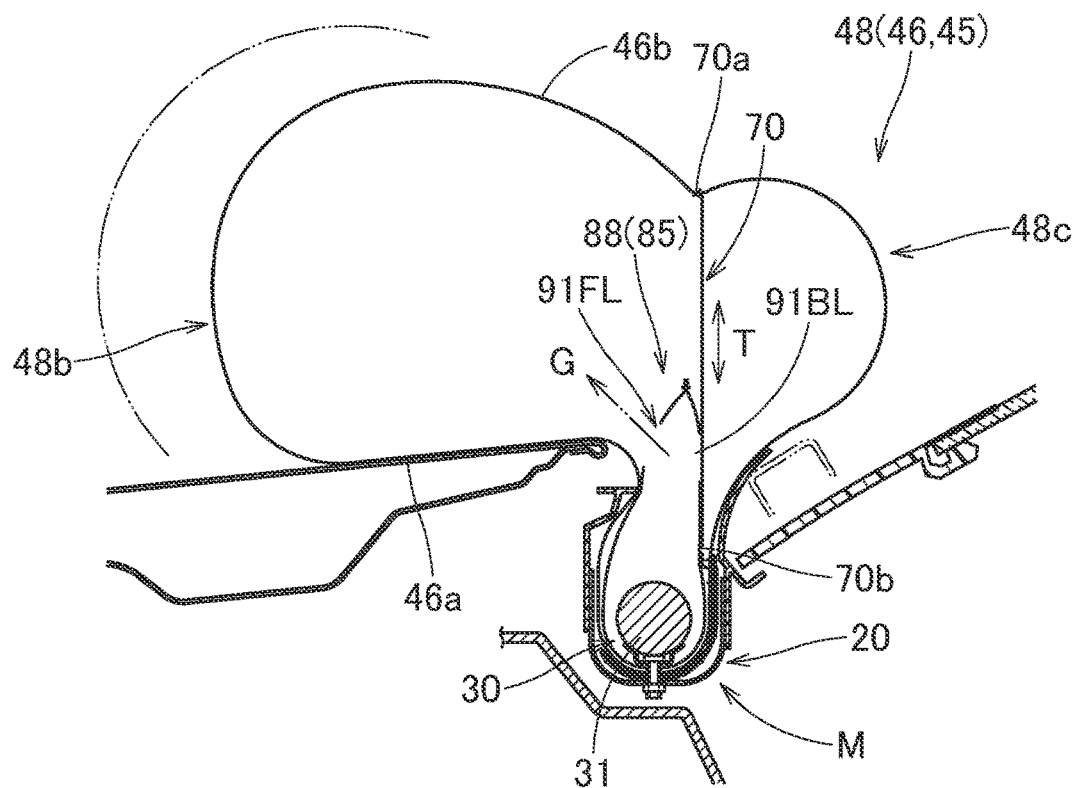
FIGS. 15A and 15B are partially enlarged vertical sectional views illustrating a process of inflating the airbag in the pedestrian airbag device of the embodiment.
Figure 15B:
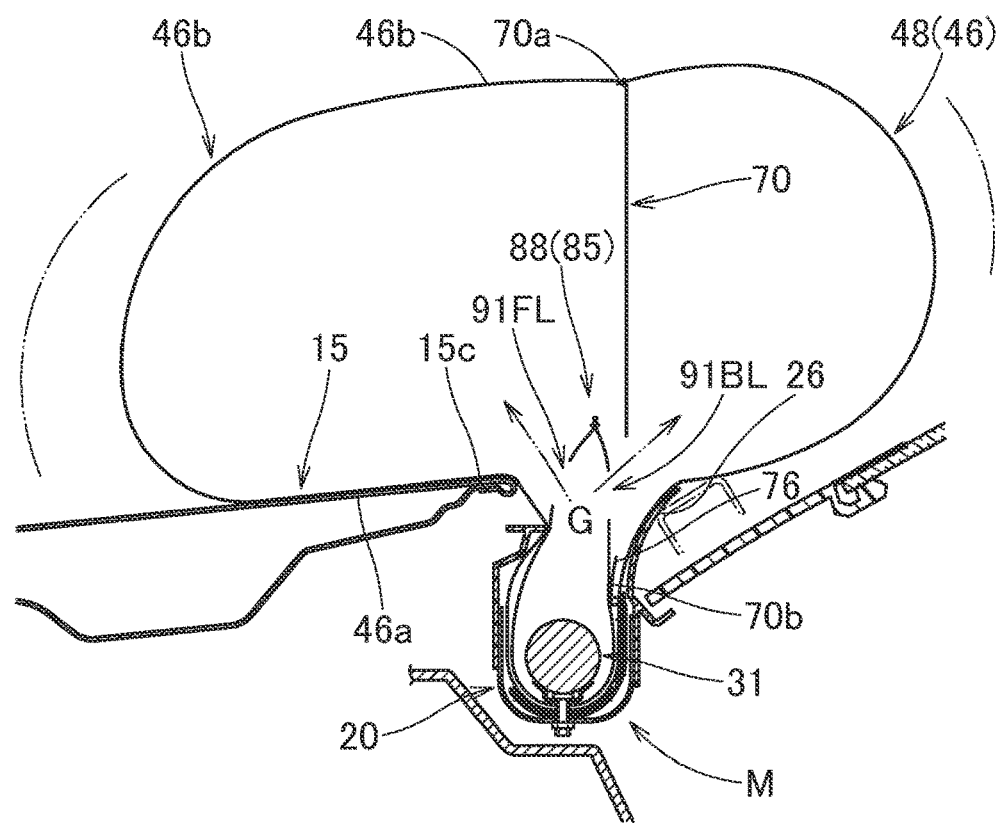
Figure 16:
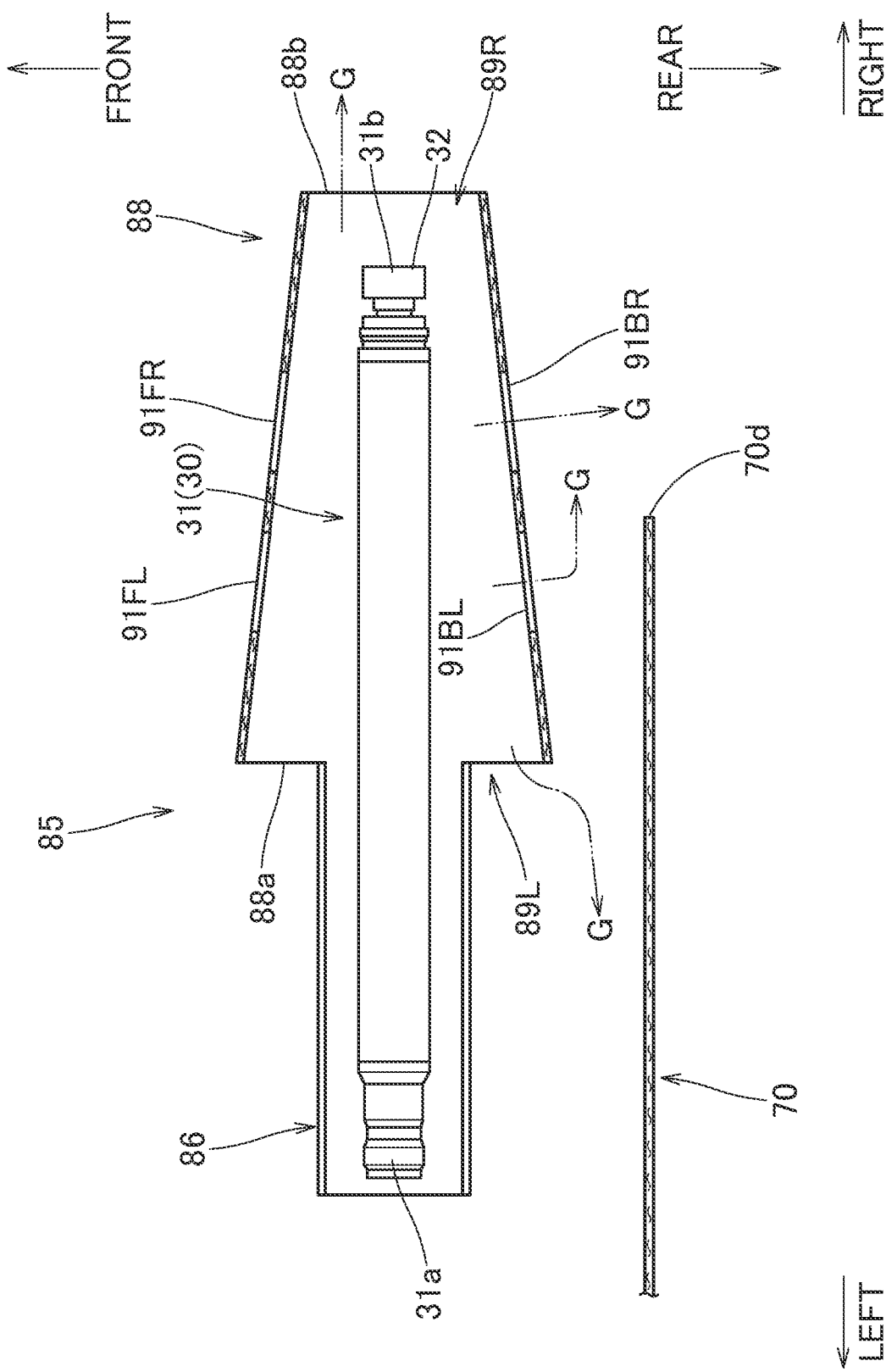
FIG. 16 is a schematic sectional view illustrating the inner tube and the gas flow regulating member at an initial inflating stage of the airbag in the pedestrian airbag device of the embodiment.

At the initial inflating stage of the bag main body 46, as illustrated in FIG. 15A, the gas flow regulating member 70 maintains the connection state between the pedestrian side wall portion 46b side and the lid panel 54 side (vehicle body side wall portion 46a side), and the inflating gas G flowing out from the outflow opening 89L and the gas outlet 91BL in the inner tube 85 is deflected outward in the left-right direction (refer to FIG. 16). When the bag main body 46 is inflated to greatly separate the pedestrian side wall portion 46b from the vehicle body side wall portion 46a side, as illustrated in FIG. 15B, the gas flow regulating member 70 causes tension T (FIGS. 13 and 15A) generated in the gas flow regulating member 70 to break and divide the planned breakable portion 71. The length dimension of the gas flow regulating member 70 is set to be shorter than those of other tethers (front-rear tethers 62AL, 62BL, 62CL, 62AR, 62BR, and 62CR, front side tethers 64L and 64R, rear side tether 65, and end side tethers 66L and 66R). Specifically, the length dimension of the gas flow regulating member 70 is set to be approximately 80% of the length dimensions of other tethers (front-rear tethers 62AL, 62BL, 62CL, 62AR, 62BR, and 62CR, front side tethers 64L and 64R, rear side tether 65, and end side tethers 66L and 66R). The length dimension of the gas flow regulating member 70 and the separation distance (width dimension of the connection site 73) between the cuts 72 in the planned breakable portion 71 are set to a dimension as follows. According to the dimension, at the initial inflating stage of the airbag 45, as described above, it is possible to suppress the rearward outflow of the inflating gas flowing out from the outflow opening 89L and the gas outlet 91BL in the inner tube 85, and it is possible to timely break the planned breakable portion 71 not to hinder quick completion of the inflation of the whole bag main body 46.

Figure 6:
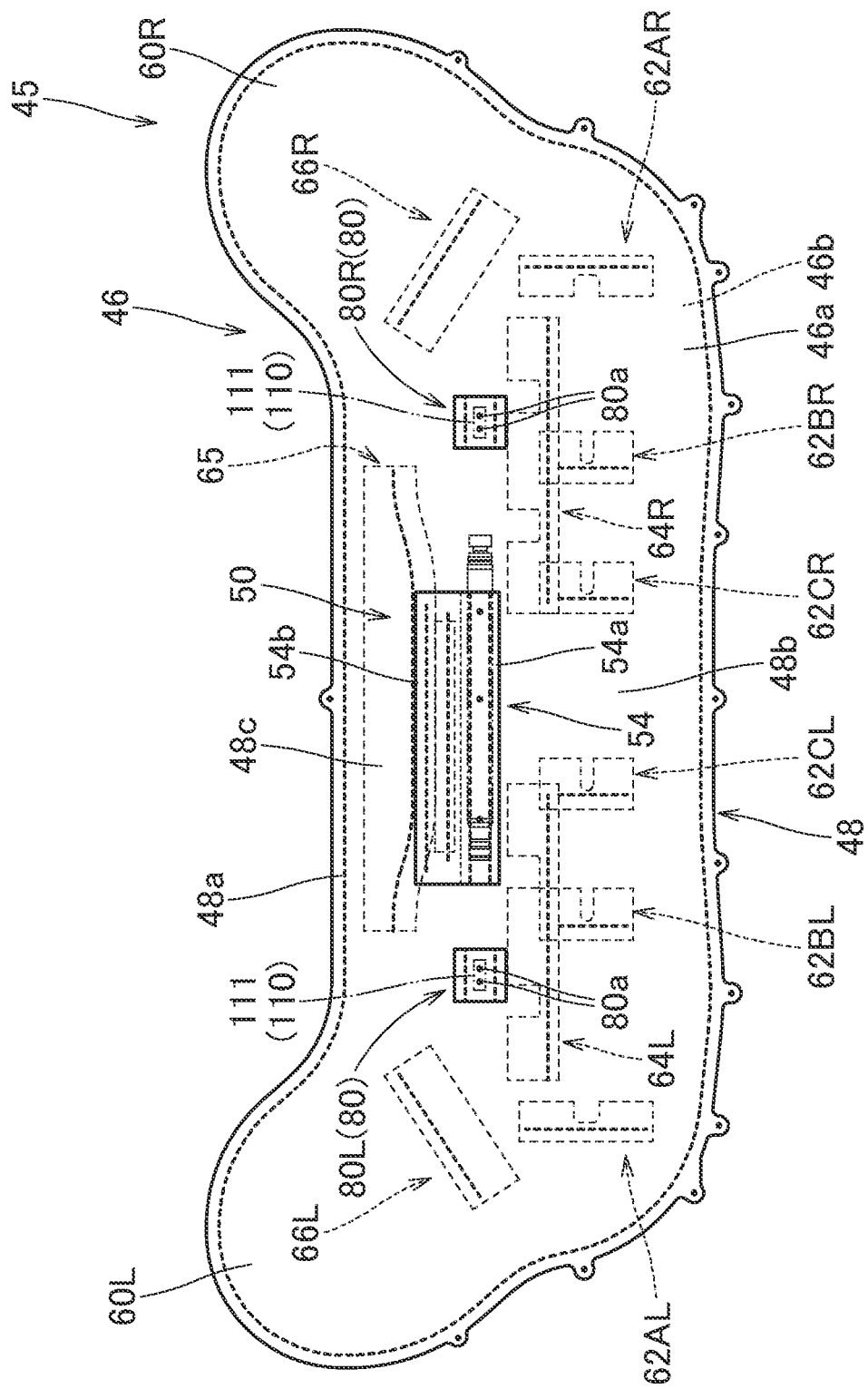
FIG. 6 is a bottom view illustrating a state where the airbag in FIG. 5 is flatly deployed.
Figure 7:
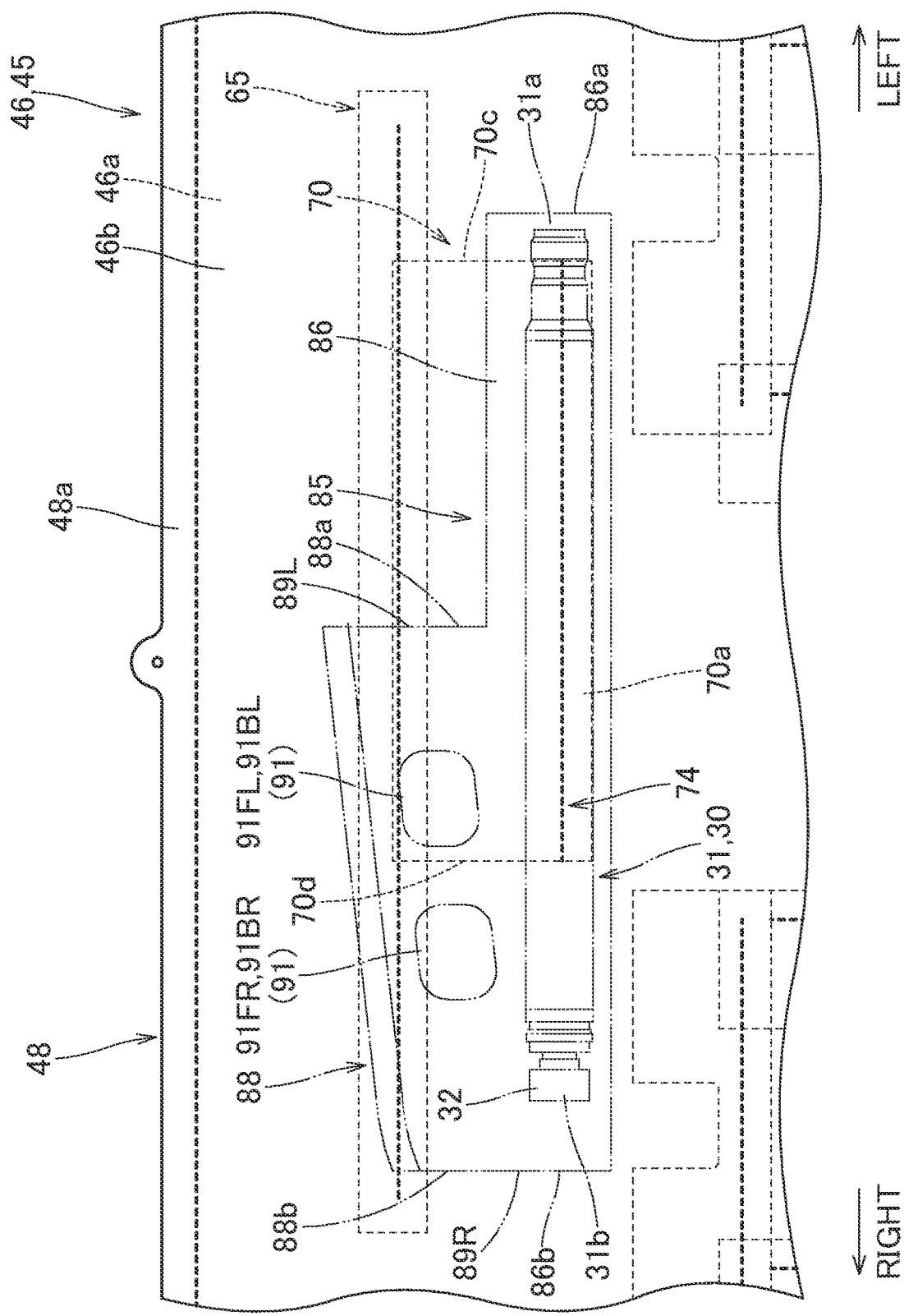
FIG. 7 is a partially enlarged plan view illustrating an insertion opening portion in the airbag in FIG. 5.

Mounting piece portions 80 for mounting the vehicle body side wall portion 46a side of the bag main body 46 on the case 20 are disposed on both right and left sides of the insertion opening portion 50. The mounting piece portions 80 are configured to include a flexible sheet body as a separate body from the bag main body 46. As illustrated in FIGS. 3 and 6, a front end side and a rear end side of the mounting piece portions 80 are joined (sewn) to the vehicle body side wall portion 46a. Each of the mounting piece portion 80 (80L and 80R) is configured to be mounted on the bottom wall portion 21 of the case 20 by using the mounting bracket 110. In a case of the embodiment, as illustrated in FIG. 6, the mounting piece portions 80 (80L and 80R) are disposed between the insertion opening portion 50 and the end side tethers 66L and 66R in a state where the bag main body 46 is flatly deployed, and are disposed at two locations which are substantially symmetrical in the left-right direction, on the rear side of the front side tethers 64L and 64R. The mounting piece portions 80 (80L and 80R) are used for inserting a mounting plate 111 (to be described later) of the mounting bracket 110 between the mounting piece portions 80 (80L, 80R) and the vehicle body side wall portion 46a (refer to FIG. 3), and have two through-holes 80a into which the mounting bolts 112 (to be described later) formed in the mounting bracket 110 can be inserted.

Figure 11:
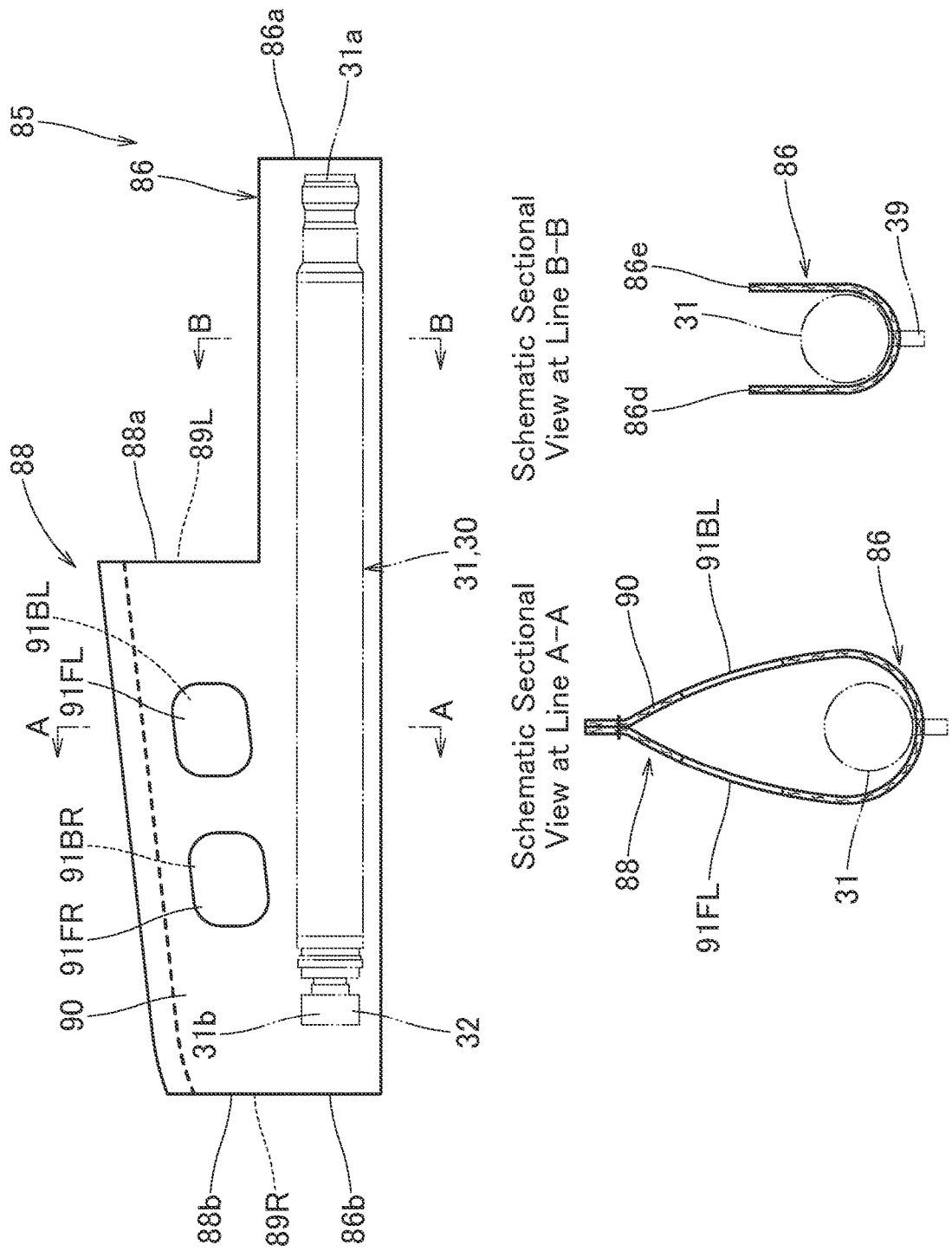
FIG. 11 is a plan view of an inner tube used in the pedestrian airbag device of the embodiment.

The inner tube 85 that covers the outer peripheral side of the inflator 30 (the inflator main body 31 and the holding portion 36 in the mounting bracket 35) is configured to include a flexible sheet body. As illustrated in FIG. 11, the inner tube 85 is configured to include a mounting side portion 86 covering the outer peripheral side of the inflator main body 31 and causing the mounting bolt 39 to protrude, and a gas flow straightening portion 88 that straightens a flow of the inflating gas discharged from the gas discharge portion 32 of the inflator main body 31.

The mounting side portion 86 is configured to have a strip shape whose longitudinal direction extends along the axial direction of the inflator main body 31 so that the outer side of the inflator main body 31 can be covered. Insertion holes 86c for causing the mounting bolts 39 of the mounting bracket 35 to protrude are formed at three positions along the longitudinal direction, at a substantially central position in the width direction in the mounting side portion 86 (refer to FIG. 12). The mounting side portion 86 is configured so that the outer side of the inflator main body 31 can be covered except for the upper surface side in a mount state on the vehicle, and the width dimension on a side in longitudinal direction (side in the left-right direction) is set to be larger than the length dimension of the inflator main body 31. That is, the width dimension of the mounting side portion 86 on the side in the left-right direction is set to be larger than the width dimension of the gas flow regulating member 70 on the side in the left-right direction. In a state where the mounting side portion 86 is accommodated inside the bag main body 46 together with the inflator 30, the mounting side portion 86 is disposed so that the right end 86b is located rightward of a right edge 70d of the gas flow regulating member 70, and the left end 86a is located leftward of a left edge 70c of the gas flow regulating member 70 (refer to FIG. 7).

The gas flow straightening portion 88 has a substantially tubular shape in both right and left end sides are open. The gas flow straightening portion 88 has a substantially tubular shape by joining the tips to each other to extend from a front edge 86d side and a rear edge 86e side of the mounting side portion 86. Specifically, the gas flow straightening portion 88 has a substantially tubular shape so that a right end 88b coincides with a right end 86b of the mounting side portion 86 to increase the diameter toward the left side. The gas flow straightening portion 88 is configured to be wide in the left-right direction so that a left end 88a is disposed at a position slightly leftward of the center in the left-right direction of the mounting side portion 86. The outflow openings 89L and 89R through which the inflating gas G flows out are disposed on the left end 88a side in the gas flow straightening portion 88 and the right end 88b side that coincides with the right end 86b of the mounting side portion 86. As described above, the gas flow straightening portion 88 has a substantially tubular shape whose diameter increases toward the left side which is the center side in the left-right direction. Although detailed illustration is omitted, the outflow opening 89L on the left side has an opening area larger than that of the outflow opening 89R on the right side. In addition, in the gas flow straightening portion 88, a gas outlet 91 through which the inflating gas flows out is disposed in a region of the peripheral wall 90. The gas outlets 91 are respectively aligned at two locations on the side in the front-rear direction, and at two locations on the side in the left-right direction. The four gas outlets 91 are disposed in total. The gas flow straightening portion 88 is configured so that the left end 88a side (outflow opening 89L on the left side) located on the center side in the left-right direction and the gas outlets 91FL and 91BL on the left side are disposed in a region overlapping the gas flow regulating member 70 in the front-rear direction (refer to FIGS. 7 and 16). When accommodated inside the bag main body 46, the rear side of these area (the outflow opening 89L, the gas outlets 91FL and 91BL) is covered by the gas flow regulating member 70. That is, in the gas flow straightening portion 88, the right end 88b side (outflow opening 89R on the right side) and the gas outlets 91FR and 91BR on the right side are disposed in a region where the rear side is not covered by the gas flow regulating member 70, when accommodated inside the bag main body 46. When the airbag 45 is deployed and inflated, the inner tube 85 is configured so that at least the gas outlets 91FL and 91BL on the left side (that is, including a region on the upper side of the outflow opening 89L) are disposed at a position protruding upward of the case 20 (refer to FIGS. 15A and 15B). The inner tube 85 is formed of an inner tube base fabric 105 illustrated in FIG. 12, and has a tubular shape by folding the inner tube base fabric 105 in half and joining (sewing) corresponding edge portions to each other.

As illustrated in FIG. 12, the airbag 45 of the embodiment includes a vehicle body side base fabric 95 forming the vehicle body side wall portion 46a of the bag main body 46, a pedestrian side base fabric 96 forming the pedestrian side wall portion 46b of the bag main body 46, tether base fabrics 98A, 98B, 99, 100, and 101 respectively forming the front-rear tethers 62AL, 62BL, 62CL, 62AR, 62BR, and 62CR, the front side tethers 64L and 64R, the rear side tether 65, and the end side tethers 66L and 66R, a lid panel base fabric 103 forming the lid panel 54, the gas flow regulating member 70, an inner tube base fabric 105 forming the inner tube 85, and the mounting piece portion 80. In the base fabrics (base materials), a coated fabric coated with a coating agent for preventing a gas leakage is cut into a predetermined shape, and the fabric is formed on a surface of a woven fabric formed by weaving polyamide yarn or polyester yarn.

The mounting brackets 110 for mounting the mounting piece portions 80 (80L and 80R) on the bottom wall portion 21 of the case 20 respectively include a substantially rectangular plate-shaped mounting plate 111 and mounting bolts 112 protruding downward from the mounting plate 111. As illustrated by a two-dot chain line in FIG. 6, the outer shape of the mounting plate 111 is a substantially rectangular plate shape which is wide on the side in the left-right direction. Although detailed illustration is omitted, the mounting bolts 112 are aligned at two locations along the left-right direction. The mounting bracket 110 is configured to mount the mounting piece portion 80 on the bottom wall portion 21 of the case 20 by causing the mounting bolts 112 protruding from the mounting piece portion 80 to protrude from the bottom wall portion 21 of the case 20 and fixing the nuts 114 (refer to FIG. 3).

Next, mounting the airbag device M of the embodiment on the vehicle V will be described. In the inflator 30, the mounting bracket 35 holds the inflator main body 31 by using the clamp 40. Then, the inflator 30 is inserted into the mounting side portion 86 of the inner tube 85 at the mounting bolts 39 protrude from the insertion holes 86c. In this case, although detailed illustration is omitted, the inner tube 85 including the gas flow straightening portion 88 is wound around the inflator main body 31 by using a tape material (not illustrated) which can be broken when the inflating gas is discharged from the gas discharge portion 32. The airbag 45 is folded so that the airbag 45 can be accommodated inside the case 20. Specifically, although detailed illustration is omitted, in order to secure an accommodation space of the inflator 30, a dummy inflator having an outer shape substantially the same as that of the inflator 30 is accommodated in the airbag 45. In a state where the bag main body 46 is flatly deployed so that the pedestrian side wall portion 46b overlaps the vehicle body side wall portion 46a, the airbag 45 is folded to be accommodated inside the case 20 by reducing the width dimension between the side in the front-rear direction and the side in the left-right direction. Thereafter, the periphery of the folded airbag 45 (completely folded body) is wrapped with a breakable wrapping material (not illustrated) for preventing a folding failure. In this case, a site between the insertion opening portion 50 and the mounting piece portion 80 in the airbag 45 is exposed from the wrapping material. The lid panel 54 in the insertion opening portion 50 is opened, and the dummy inflator is pulled out from the insertion slit 51. The dummy inflator is taken out from the completely folded body (bag main body 46). The inflator 30 in a state where the inner tube 85 is externally wound as described above is inserted into the completely folded body (bag main body 46)

through the insertion slit 51. The inflator 30 is accommodated inside the bag main body 46. In this case, each of the mounting bolts 39 protrudes from the insertion hole 52. Thereafter, the lid panel 54 is closed to cover the insertion slit 51, and each of the mounting bolts 39 is inserted into the mounting hole 56 on the front end 54a side. In addition, the mounting bracket 110 is mounted on each of the mounting piece portions 80 to manufacture an airbag assembly. Thereafter, the airbag assembly is accommodated inside the case 20 so that the respective mounting bolts 39 and 112 are protruded from the bottom wall portion 21, and the nuts 42 and 114 are fastened to the respective mounting bolts 39 and 112 protruding from the bottom wall portion 21. The airbag 45 and the inflator 30 can be mounted on the case 20. Thereafter, when the airbag cover 25 is mounted on the case 20, a bracket (not illustrated) extending from the case 20 is mounted on the cowl panel 7a, and the inflator main body 31 is connected to an operation circuit (not illustrated), the airbag device M can be mounted on the vehicle V.

In the airbag device M of the embodiment, when an operation circuit (not illustrated) detects a collision between the vehicle V and a pedestrian, based on a signal from a sensor (not illustrated) disposed in the front bumper 6, the inflator 30 is activated, and the inflating gas flows into the airbag 45 to be inflated. The inflated airbag 45 pushes and opens the door portion 26 of the airbag cover 25. While the airbag 45 protrudes upward from the protrusion opening 20a of the case 20 formed by pushing and opening the door portion 26, the inflation of the airbag 45 is completed to cover the lower portion 5a side of the front surface of the front pillars 5L and 5R from the upper surface of the rear end 15c of the hood panel 15 to the upper surface of the cowl 7 (refer to FIGS. 17 and 18).

In the airbag device M of the embodiment, the gas flow regulating member 70 for suppressing a rearward outflow of the inflating gas discharged from the inflator main body 31 is disposed at a position rearward of the inflator main body 31 serving as the main body portion of the inflator 30, inside the cowl cover portion 48. Therefore, at the initial inflating stage of the airbag 45, it is possible to suppress a possibility that the inflating gas may flow to the pillar cover portions 60L and 60R side disposed behind the inflator main body 31. As a result, in the cowl cover portion 48, in particular, a front side region 48b which is the front side of the gas flow regulating member 70 can quickly be inflated.

Therefore, in the airbag device M of the embodiment, the front side region 48b of the cowl cover portion 48 can quickly be inflated.

In the airbag device M of the embodiment, the inflator main body 31 is disposed inside the cowl cover portion 48 in a state where the gas discharge portion 32 is disposed on one end (right end 31b) side, and the outer peripheral side is covered by the inner tube 85. Therefore, the inflating gas G discharged from the gas discharge portion 32 can flow into the airbag 45 (bag main body 46) from the gas flow straightening portion 88 of the inner tube 85 in a straightened flow state. Specifically, the gas flow straightening portion 88 of the inner tube 85 includes the two outflow openings 89L and 89R and the four gas outlets 91FL, 91FR, 91BL, and 91BR. Therefore, the inflating gas can be discharged from the outflow openings 89L and 89R and the gas outlets 91FL, 91FR, 91BL, and 91BR in a well-balanced manner in the front-rear and left-right directions. Furthermore, in the airbag device M of the embodiment, the gas flow regulating member 70 is disposed to cover a partial rear side of the gas flow straightening portion 88 in the inner tube 85. Specifically, the gas flow regulating member 70 is disposed to cover a central side end portion of the inflator main body 31 in the gas flow straightening portion 88, that is, the rear side of the outflow opening 89L provided on the left end 88a side and the gas outlet 91BL. Therefore, the inflating gas G flowing out from the outflow opening 89L and the gas outlet 91BL is deflected by the gas flow regulating member 70, and rearward flow thereof is suppressed. The inflating gas G flowing out from the other outflow opening 89BR and the other gas outlet 91BR flows rearward without being regulated by the gas flow regulating member 70 (refer to FIG. 16). As a result, in the airbag device M of the embodiment, even at the initial inflating stage of the airbag 45, to some extent, the inflating gas can flow to a rear side region 48c on the rear side of the gas flow regulating member 70 in the cowl cover portion 48 or the pillar cover portions 60L and 60R. Therefore, it is possible to suppress a possibility that the pillar cover portions 60L and 60R may be inflated later more than necessary, and the whole airbag 45 can quickly and stably be inflated.

Furthermore, in the airbag device M of the embodiment, when tension acts due to separation of the pedestrian side wall portion 46b from the vehicle body side wall portion 46a side during the inflation of the airbag 45, the gas flow regulating member 70 is dividable over the entire length in the left-right direction to release a connection state between the pedestrian side wall portion 46b and the vehicle body side wall portion 46a. Therefore, during the inflation of the airbag 45, the regulation by the gas flow regulating member 70 is released. After the front side region 48b of the cowl cover portion 48 is inflated ahead, while the whole cowl cover portion 48 is inflated to be thick, the pillar cover portions 60L and 60R can quickly be inflated. If such advantageous effects do not have to be considered, as the gas flow regulating member, a configuration may be adopted as follows. The connection state between the pedestrian side wall portion and the vehicle body side wall portion is maintained until the airbag is completely inflated, and the thickness of the cowl cover portion can be regulated until the airbag is completely inflated.

Furthermore, in the airbag device M of the embodiment, the gas flow regulating member 70 is provided with an intermittent cut 72 substantially extending along the longitudinal direction of the inflator main body 31 serving as the left-right direction, and breaks a peripheral edge site (connection site 73) of the cut 72 when the airbag 45 is inflated. In this manner, the planned breakable portion 71 dividable over the entire length is disposed. In addition, the planned breakable portion 71 is formed near the lower end 70b of the gas flow regulating member 70, and is formed at a position where a site on the vehicle body side wall portion side (lower end side site 76) in the gas flow regulating member 70 after being divided can be disposed below the upper surface of the hood panel 15. Therefore, the lower end side site 76 of the gas flow regulating member 70 which is generated after the planned breakable portion 71 is broken does not protrude upward from the rear end 15c of the hood panel 15 (refer to FIG. 15B). It is possible to suppress a possibility that the gas flow of the inflating gas flowing inside the airbag 45 inflated and protruded from the case 20 may be affected by the lower end side site 76. As a result, the inflating gas can smoothly flow into the pillar cover portions 60L and 60R and the rear side region 48c of the cowl cover portion 48 which are inflated later than the front side region 48b of the cowl cover portion 48. As a matter of course, if such advantageous effects do not have to be considered, the planned breakable portion may be disposed near the center in the up-down direction of the gas flow regulating member or on the upper end side which is the pedestrian side wall portion side.

Figure 14:
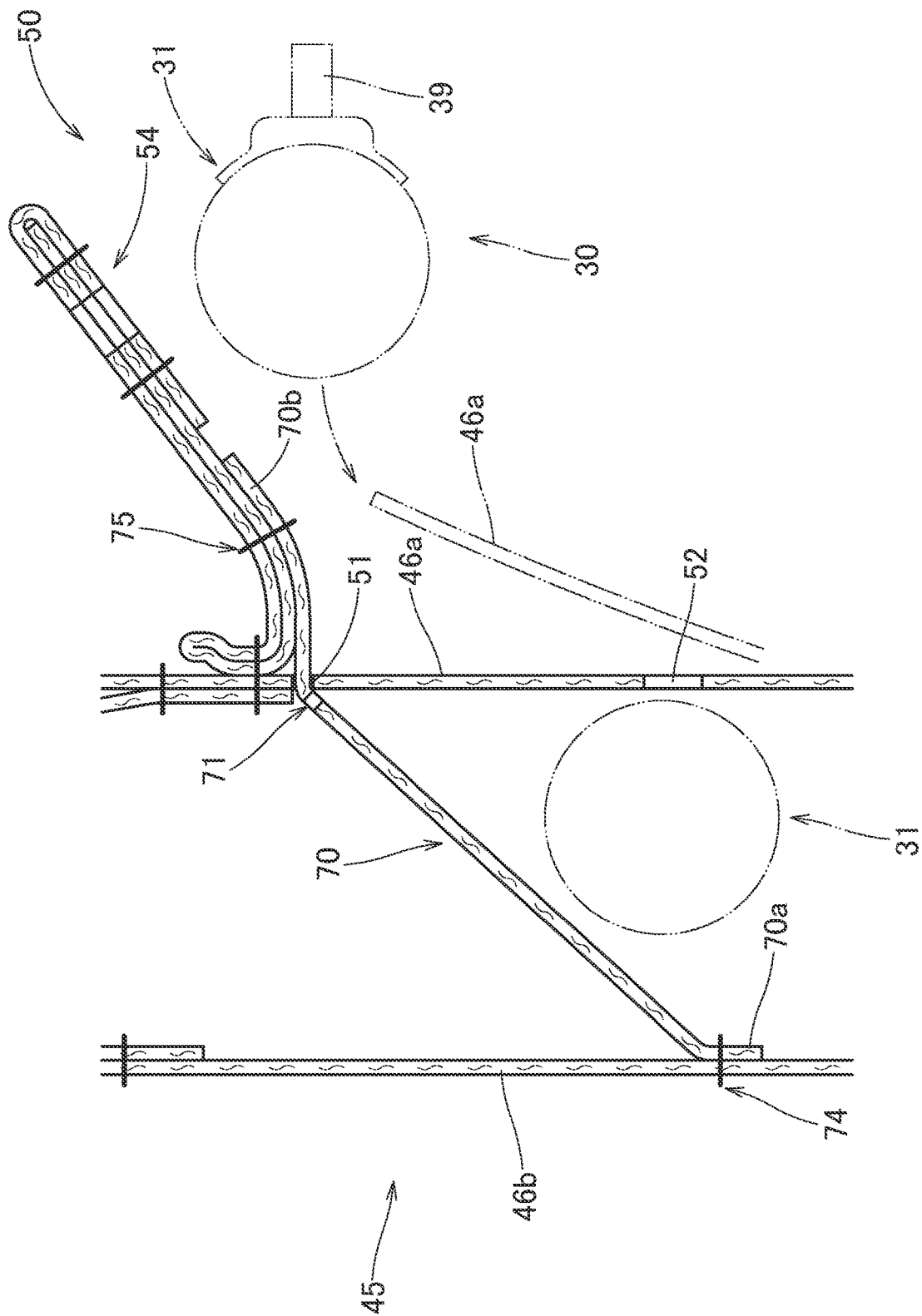
FIG. 14 is a partially enlarged sectional view illustrating a state where a lid panel is opened in the airbag in FIG. 5.

Furthermore, in the airbag device M of the embodiment, the gas flow regulating member 70 is inserted into the insertion slit 51 formed to insert the inflator 30 into the insertion slit 51 in the airbag 45. In this manner, the lower end 70b side which is an end portion on the vehicle body side wall portion 46a side is joined to the lid panel 54 in the insertion opening portion 50. Therefore, when the inflator main body 31 is inserted into the folded airbag 45 through the insertion slit 51, a region separated from the insertion hole 52 in the peripheral edge of the insertion slit 51 is closed by the gas flow regulating member 70. According to this aspect, the inflator main body 31 can smoothly be guided to the insertion hole 52 side by the gas flow regulating member 70. As a result, the inflator 30 can easily be assembled to the airbag 45 by suppressing occurrence of erroneous insertion. In addition, in the airbag device M of the embodiment, the planned breakable portion 71 formed in the gas flow regulating member 70 is disposed near the insertion slit 51. Therefore, as illustrated in FIG. 14, when the inflator main body 31 is inserted into the airbag 45 (bag main body 46) through the insertion slit 51, it is possible to suppress a possibility that the inflator main body 31 or the mounting bolt 39 may interfere with the planned breakable portion 71 formed in the gas flow regulating member 70, and satisfactory workability of inserting the inflator 30 into the airbag 45 is achieved.

The present disclosure relates to a pedestrian airbag device having the following configuration.

The pedestrian airbag device includes an airbag that is folded and accommodated in an accommodation site disposed near a rear end of a hood panel of a vehicle, that has a vehicle body side wall portion disposed on a body side when inflation is completed, and a pedestrian side wall portion disposed to face the vehicle body side wall portion, is formed into a bag shape by joining outer peripheral edges of the pedestrian side wall portion and the vehicle body side wall portion to each other over an entire periphery, and that includes a cowl cover portion and covering an upper surface side of a region from a rear end side of the hood panel to a cowl when the inflation is completed, and two pillar cover portions extending rearward from both ends of the cowl cover portion, and covering a lower front surface side of right and left front pillars, and an inflator supplying an inflating gas to the airbag, and including a main body portion having a substantially columnar outer shape, and a mounting bolt disposed to protrude from an outer peripheral surface of the main body portion in an axis orthogonal direction of the main body portion, in which the main body portion is mounted on the accommodation site by using the mounting bolt in a state where the main body portion is inserted into the cowl cover portion so that the mounting bolt protrudes outward while an axial direction is disposed to substantially extend along a left-right direction. A gas flow regulating member formed of a flexible sheet body, connecting the pedestrian side wall portion and the vehicle body side wall portion to each other, and suppressing a rearward outflow of the inflating gas discharged from the main body portion is disposed at a position on a rear side of the main body portion inside the cowl cover portion.

In the pedestrian airbag device of the present disclosure, the gas flow regulating member that suppresses the rearward outflow of the inflating gas discharged from the main body portion is disposed at a position rearward of the main body portion of the inflator, inside the cowl cover portion. Therefore, at the initial inflating stage of the airbag, it is possible to suppress a possibility that the inflating gas may flow to the pillar cover portion side disposed behind the main body portion. As a result, in the cowl cover portion, in particular, the region on the front side of the gas flow regulating member can quickly be inflated.

Therefore, in the pedestrian airbag device of the present disclosure, the region on the front side in the cowl cover portion can quickly be inflated.

Specifically, in the pedestrian airbag device of the present disclosure, it is preferable to adopt configurations as follows. In a state where the gas discharge portion for discharging the inflating gas is disposed on one end side and the outer peripheral side is covered by the tubular inner tube formed of the flexible sheet body, the main body portion of the inflator is disposed inside the cowl cover portion.

The inner tube includes the mounting side portion covering the outer peripheral side of the main body portion and causing the mounting bolt to protrude, and the gas flow straightening portion that straightens a flow of the inflating gas discharged from the gas discharge portion.

The gas flow straightening portion has a substantially tubular shape in which both right and left end sides serving as the gas discharge portion side and the center side of the main body portion are open, and the gas outlet through which the inflating gas flows out is disposed in the peripheral wall region.

The gas flow regulating member can cover the rear side of the opening of the end portion on the center side of the main body portion in the gas flow straightening portion and the gas outlet.

According to the above-described configuration of the pedestrian airbag device, the inflating gas discharged from the gas discharge portion of the main body portion can be discharged into the airbag in a straightened flow state by the inner tube. The gas flow regulating member is disposed to cover a partial rear side of the gas flow straightening portion in the inner tube. Accordingly, even at the initial inflating stage of the airbag, to some extent, the inflating gas flowing out from the gas flow straightening portion can flow to the pillar cover portion side. Therefore, it is possible to suppress a possibility that the pillar cover portion may be inflated late more than necessary, and the whole airbag can quickly and stably be inflated.

Furthermore, in the pedestrian airbag device having the above-described configuration, it is preferable that the gas flow regulating member is dividable over the entire length in the left-right direction to release a connection state between the pedestrian side wall portion and the vehicle body side wall portion when tension acts due to separation of the pedestrian side wall portion from the vehicle body side wall portion side during the inflation of the airbag. According to this configuration of the pedestrian airbag device, the regulation by the gas flow regulating member is released during the inflation of the airbag. Therefore, after a region on the front side of the cowl cover portion is inflated ahead, while the whole cowl cover portion is inflated to be thick, the pillar cover portions can quickly be inflated.

Furthermore, in the pedestrian airbag device having the above-described configuration, it is preferable to adopt the following configuration. The gas flow regulating member is provided with the planned breakable portion dividable over the entire length by providing the intermittent cut substantially extending along the longitudinal direction of the main body portion which is the left-right direction and breaking the peripheral edge site of the cut when the airbag is inflated.

The planned breakable portion is formed at the position where the site on the broken vehicle body side wall portion side in the gas flow regulating member after being divided is disposed below the upper surface of the hood panel.

According to this configuration of the pedestrian airbag device, it is possible to suppress a possibility that the gas flow of the inflating gas flowing inside the airbag inflated and protruded from the accommodation site may be affected by site on the vehicle body side wall portion side of the gas flow regulating member which is generated after the planned breakable portion is broken. Therefore, the inflating gas can smoothly flow into the pillar cover portion inflated later than the region on the front side of the cowl cover portion or into the region on the rear side of the cowl cover portion.

Furthermore, it is preferable that the pedestrian airbag device having the above-described configuration adopts the following configuration. The insertion opening portion for inserting the inflator into the insertion opening portion is formed in the vehicle body side wall portion.

The insertion opening portion includes
the insertion slit for inserting the main body portion by providing the cut in the vehicle body side wall portion to substantially extend along the axial direction of the main body portion in the vehicle body side wall portion,
the insertion hole for causing the mounting bolt to protrude by being disposed at the position separated from the insertion slit on the side in a substantially orthogonal direction, in the vehicle body side wall portion, and
the flexible lid panel disposed on the outer peripheral side of the vehicle body side wall portion and closing the insertion slit.

One end side of the lid panel is joined to the vehicle body side wall portion, and the mounting hole for causing the mounting bolt to protrude to correspond to the insertion hole is disposed on the other end side.

The end portion on the vehicle body side wall portion side of the gas flow regulating member is joined to the lid panel by inserting into the insertion slit.

According to this configuration of the pedestrian airbag device, when the main body portion of the inflator is inserted into the folded airbag through the insertion slit, the region on the side separated from the insertion hole in the peripheral edge of the insertion slit is closed by the gas flow regulating member. According to this aspect, the main body portion of the inflator can smoothly be guided to the insertion hole side by the gas flow regulating member. Therefore, the inflator can easily be assembled to the airbag by suppressing the occurrence of erroneous insertion.

What is claimed is:

1. A pedestrian airbag device comprising:
an airbag that is folded and accommodated in an accommodation site disposed near a rear end of a hood panel of a vehicle, that has a vehicle body side wall portion disposed on a body side when inflation is completed, and a pedestrian side wall portion disposed to face the vehicle body side wall portion, is formed into a bag shape by joining outer peripheral edges of the pedestrian side wall portion and the vehicle body side wall portion to each other over an entire periphery, and that includes a cowl cover portion covering an upper surface side of a region from a rear end side of the hood panel to a cowl when the inflation is completed, and two pillar cover portions extending rearward from both ends of the cowl cover portion and covering a lower front surface side of right and left front pillars; and
an inflator supplying an inflating gas to the airbag, and including a main body portion having a substantially columnar outer shape, and a mounting bolt disposed to protrude from an outer peripheral surface of the main body portion in an axis orthogonal direction of the main body portion, in which the main body portion is mounted on the accommodation site by using the mounting bolt in a state where the main body portion is inserted into the cowl cover portion so that the mounting bolt protrudes outward while an axial direction is disposed to substantially extend along a left-right direction,
wherein a gas flow regulating member formed of a flexible sheet body, connecting the pedestrian side wall portion and the vehicle body side wall portion to each other, and suppressing a rearward outflow of the inflating gas discharged from the main body portion is disposed at a position on a rear side of the main body portion inside the cowl cover portion,
wherein the main body portion of the inflator is disposed inside the cowl cover portion in a state where a gas discharge portion for discharging the inflating gas is disposed on one end side, and an outer peripheral side is covered by a tubular inner tube formed of a flexible sheet body,
the inner tube includes mounting side portion covering the outer peripheral side of the main body portion and causing the mounting bolt to protrude, and a gas flow straightening portion that straightens a flow of the inflating gas discharged from the gas discharge portion,
the gas flow straightening portion has a substantially tubular shape in which both right and left end sides serving as the gas discharge portion side and a center side of the main body portion are open, and includes a gas outlet through which the inflating gas flows out, in a peripheral wall region, and
the gas flow regulating member is configured to cover a rear side of an opening of an end portion on a center side of the main body portion in the gas flow straightening portion and the gas outlet.

2. The pedestrian airbag device according to claim 1, wherein when tension acts due to separation of the pedestrian side wall portion from the vehicle body side wall portion side when the airbag is inflated, the gas flow regulating member is dividable over an entire length in the left-right direction so that a connection state between the pedestrian side wall portion and the vehicle body side wall portion is released.

3. The pedestrian airbag device according to claim 2, wherein the gas flow regulating member has a planned breakable portion dividable over the entire length by providing an intermittent cut substantially extending along a longitudinal direction of the main body portion which is the left-right direction and breaking a peripheral edge site of the cut when the airbag is inflated, and
the planned breakable portion is formed at a position where a site on the vehicle body side wall portion side in the gas flow regulating member after being divided is disposed below an upper surface of the hood panel.

4. The pedestrian airbag device according to claim 3, wherein an insertion opening portion for inserting the inflator into the vehicle body side wall portion is formed in the vehicle body side wall portion,
the insertion opening portion includes
an insertion slit for inserting the main body portion by providing the cut in the vehicle body side wall portion to substantially extend along the axial direction of the main body portion, an insertion hole for causing the mounting bolt to protrude by being disposed at a position separated from the insertion slit on a side in a substantially orthogonal direction, in the vehicle body side wall portion, and a flexible lid panel disposed on an outer peripheral side of the vehicle body side wall portion and closing the insertion slit, the lid panel is configured so that one end side is joined to the vehicle body side wall portion, and a mounting hole for causing the mounting bolt to protrude to correspond to the insertion hole is disposed on the other end side, and an end portion on the vehicle body side wall portion side is joined to the lid panel so that the gas flow regulating member is inserted into the insertion slit.

5. A pedestrian airbag device comprising:

an airbag that is folded and accommodated in an accommodation site disposed near a rear end of a hood panel of a vehicle, that has a vehicle body side wall portion disposed on a body side when inflation is completed, and a pedestrian side wall portion disposed to face the vehicle body side wall portion, is formed into a bag shape by joining outer peripheral edges of the pedestrian side wall portion and the vehicle body side wall portion to each other over an entire periphery, and that includes a cowl cover portion covering an upper surface side of a region from a rear end side of the hood panel to a cowl when the inflation is completed, and two pillar cover portions extending rearward from both ends of the cowl cover portion and covering a lower front surface side of right and left front pillars; and an inflator supplying an inflating gas to the airbag, and including a main body portion having a substantially columnar outer shape, and a mounting bolt disposed to protrude from an outer peripheral surface of the main body portion in an axis orthogonal direction of the main body portion, in which the main body portion is mounted on the accommodation site by using the mounting bolt in a state where the main body portion is inserted into the cowl cover portion so that the mounting bolt protrudes outward while an axial direction is disposed to substantially extend along a left-right direction, wherein a gas flow regulating member formed of a flexible sheet body, connecting the pedestrian side wall portion and the vehicle body side wall portion to each other, and suppressing a rearward outflow of the inflating gas discharged from the main body portion is disposed at a position on a rear side of the main body portion inside the cowl cover portion, wherein when tension acts due to separation of the pedestrian side wall portion from the vehicle body side wall portion side when the airbag is inflated, the gas flow regulating member is dividable over an entire length in the left-right direction so that a connection state between the pedestrian side wall portion and the vehicle body side wall is released, wherein the gas flow regulating member has a planned breakable portion dividable over the entire length by providing an intermittent cut substantially extending along a longitudinal direction of the main body portion which is the left-right direction and breaking a peripheral edge site of the cut when the airbag is inflated, and the planned breakable portion is formed at a position where a site on the vehicle body side wall portion side in the gas flow regulating member after being divided is disposed below an upper surface of the hood panel.

6. The pedestrian airbag device according to claim 5, wherein an insertion opening portion for inserting the inflator into the vehicle body side wall portion is formed in the vehicle body side wall portion, the insertion opening portion includes an insertion slit for inserting the main body portion by providing the cut in the vehicle body side wall portion to substantially extend along the axial direction of the main body portion, an insertion hole for causing the mounting bolt to protrude by being disposed at a position separated from the insertion slit on a side in a substantially orthogonal direction, in the vehicle body side wall portion, and a flexible lid panel disposed on an outer peripheral side of the vehicle body side wall portion and closing the insertion slit, the lid panel is configured so that one end side is joined to the vehicle body side wall portion, and a mounting hole for causing the mounting bolt to protrude to correspond to the insertion hole is disposed on the other end side, and an end portion on the vehicle body side wall portion side is joined to the lid panel so that the gas flow regulating member is inserted into the insertion slit.

* * * * *